United States Patent
Hirasaka et al.

(10) Patent No.: US 7,453,665 B2
(45) Date of Patent: Nov. 18, 2008

(54) METHOD OF ADJUSTING MAGNETIC HEAD OF MAGNETIC TAPE RECORDING AND REPRODUCING APPARATUS AND MAGNETIC TAPE RECORDING AND REPRODUCING APPARATUS

(75) Inventors: Hisato Hirasaka, Tokyo (JP); Toshiaki Wakita, Kanagawa (JP)

(73) Assignee: Sony Corporation, Tokyo (JP)

( * ) Notice: Subject to any disclaimer, the term of this patent is extended or adjusted under 35 U.S.C. 154(b) by 240 days.

(21) Appl. No.: 11/519,398

(22) Filed: Sep. 11, 2006

(65) Prior Publication Data

US 2007/0064336 A1    Mar. 22, 2007

(30) Foreign Application Priority Data

Sep. 13, 2005    (JP)    ............... 2005-265564

(51) Int. Cl.
G11B 5/58    (2006.01)
G11B 5/584    (2006.01)

(52) U.S. Cl. ............... 360/77.15; 360/64; 360/75; 360/77.06; 360/77.13; 360/77.14

(58) Field of Classification Search ............... None
See application file for complete search history.

(56) References Cited

U.S. PATENT DOCUMENTS

| | | | | |
|---|---|---|---|---|
| 5,081,550 A * | 1/1992 | Yagisawa et al. | ......... | 360/78.02 |
| 5,412,520 A * | 5/1995 | Saito | ............... | 360/77.15 |
| 5,539,589 A * | 7/1996 | Yamamoto | ............... | 360/64 |
| 5,886,843 A * | 3/1999 | Ozue et al. | ............... | 360/64 |
| 6,172,831 B1 * | 1/2001 | Usui | ............... | 360/64 |
| 6,185,062 B1 * | 2/2001 | Nonoyama | ............... | 360/77.15 |
| 6,304,410 B1 * | 10/2001 | Kita et al. | ............... | 360/84 |
| 6,639,747 B2 * | 10/2003 | Asakura et al. | ............... | 360/62 |
| 6,922,298 B2 * | 7/2005 | Ozue | ............... | 360/64 |

FOREIGN PATENT DOCUMENTS

| | | |
|---|---|---|
| JP | 63-87609 | 4/1988 |
| JP | 63-96719 | 4/1988 |
| JP | 04-278215 | 10/1992 |
| JP | 08-63730 | 3/1996 |
| JP | 2001-184616 | 7/2001 |

\* cited by examiner

Primary Examiner—Hoa T. Nguyen
Assistant Examiner—Dismery Mercedes
(74) Attorney, Agent, or Firm—Robert J. Depke; Rockey, Depke & Lyons, LLC

(57) ABSTRACT

Processing wherein a measurement signal and an erasure signal are recorded on adjacent tracks of a recordable tape 10 by one recording head HWi of n (i=1 to n) recording heads is effected on n recording heads, and measurement signals are recorded on n tracks substantially simultaneously by n recording heads HW1 to HWn in standard operation state. Then, reproducing heads with respect to thus obtained two kinds of tracks are displaced in track width directions, characteristic curves of reproduced signal waveform amplitudes of measurement signals displacement (off-track) amounts of tracks are obtained, half widths of these characteristic curves are assumed to be expedient track width and a variable Ri optimum and a variable Ri now corresponding to track widths of two kinds of tracks are obtained. Then, deviation between the variable Ri optimum and the variable Ri now is adjusted to become smaller than a desired value.

11 Claims, 24 Drawing Sheets

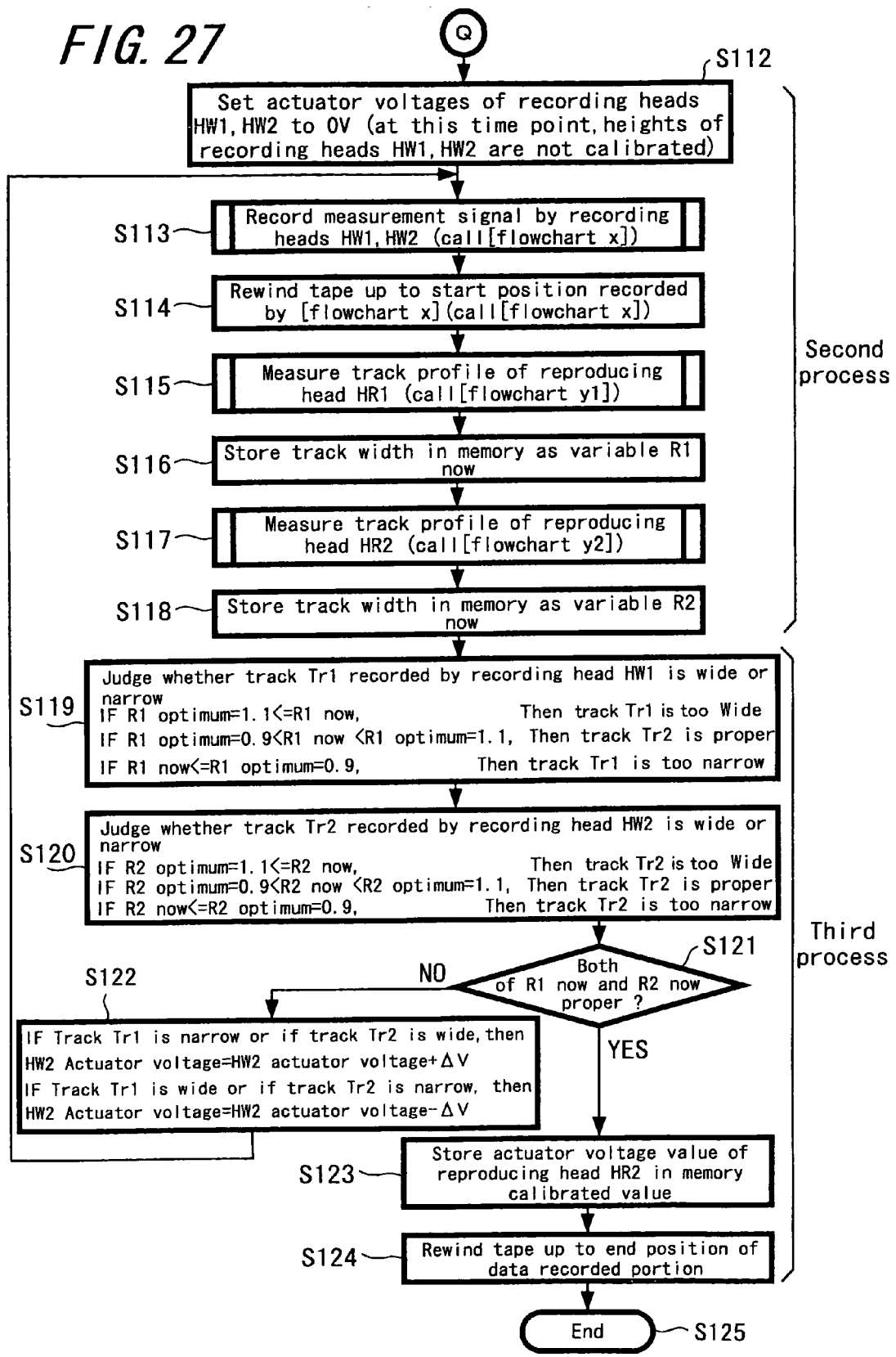

METHOD OF ADJUSTING MAGNETIC HEAD OF MAGNETIC TAPE RECORDING AND REPRODUCING APPARATUS AND MAGNETIC TAPE RECORDING AND REPRODUCING APPARATUS

CROSS REFERENCES TO RELATED APPLICATIONS

The present invention contains subject matter related to Japanese Patent Application JP 2005-265564 filed in the Japanese Patent Office on Sep. 13, 2005, the entire contents of which being incorporated hereby by reference.

BACKGROUND OF THE INVENTION

1. Field of the Invention

The present invention relates to a method of adjusting a recording head of a helical scan system magnetic tape recording and reproducing apparatus and a magnetic tape recording and reproducing apparatus in which magnetic heads can be easily calibrated by users 2. Description of the Related Art In general, in a helical scan system magnetic tape recording and reproducing apparatus, reproducing heads of the same number as n recording heads, for example, are mounted on a rotary drum. Then, as shown in FIG. 1, a rotary axis of the rotary drum is located in the direction oblique to the running direction of a magnetic tape so that a magnetic tape is helically (spirally) wound around the rotary drum of the magnetic tape recording and reproducing apparatus. In consequence, the magnetic tape is transported at a constant velocity at the same time heads on the rotary drum are rotated and thereby the heads are able to scan the magnetic tape helically (that is, in a helical scan fashion).

More specifically, as shown in FIG. 2, in a magnetic tape recording and reproducing apparatus including a rotary drum 20 onto which two recording heads HW1, HW2 and two reproducing heads HR1, HR2 are attached at an interval of 90 degrees relative to the rotation center of the rotary drum 20, a magnetic tape (hereinafter simply referred to as a "tape") 10 is wrapped around the rotary drum 10. The tape 10 is transported at a constant velocity at the same time the rotary drum 20 starts to rotate. As a result, the recording heads HW1, HW2 and the reproducing HR1, HR2 become able to scan the tape 10 helically (see FIG. 1).

Then, when magnetic information is recorded on the tape 10 by the two recording heads HW1 and HW2, as shown in FIG. 3, belt-like tracks Tr, . . . , in which magnetic information is recorded (written) are obliquely formed on the tape 10. It should be noted that, in FIG. 3, Tr1 represents a track formed on the tape 10 by the recording head HW1 and that Tr2 represents a track formed on the tape 10 by the recording head HW2.

Also, when the tape 10 in which the tracks Tr1 and the tracks Tr2 are formed is reproduced by the two reproducing heads HR1 and HR2, magnetic information recorded on the track Tr1 is reproduced by the reproducing head HR1 and magnetic information recorded on the track Tr2 is reproduced by the reproducing head HR2, respectively.

As described above, in the magnetic tape recording and reproducing apparatus including the two recording heads HW1, HW2 and the two reproducing heads HR1, HR2 shown in FIG. 2, it is customary that magnetic information recorded by the recording head HW1 is reproduced by the reproducing head HR1, magnetic information recorded by the recording head HW2 is reproduced by the reproducing head HR2 and that the tracks Tr1 and Tr2 makes a pair.

More specifically, in the magnetic tape recording and reproducing apparatus in which n recording heads HWi (i=1 to n) and reproducing heads HRi (i=1 to n) of the same number as that of the recording heads HWi are mounted on the rotary drum, the recording heads HWi and the reproducing heads HRi may correspond to each other in a one-to-one correspondence fashion and n tracks may form a set of tracks.

Then, according to the head arrangement shown in FIG. 2, in the normal operation state in which the tape 10 is transported at a normal tape transport speed of a predetermined value and in which the rotary drum 20 is rotated at a normal rotating speed of a predetermined value under control, the recording head HW1 and the reproducing head HR1 may scan the area of the track Tr1 shown in FIG. 3 during 0.5 rotation of the first half of one rotation of the rotary drum 20 and the recording head HW2 and the reproducing head HR2 may scan the area of the track Tr2 shown in FIG. 3 during 0.5 rotation of the second half of one rotation of the rotary drum 20. Finally, the two tracks Tr1 and Tr2 are scanned substantially simultaneously by the heads during one rotation of the rotary drum 20.

In recent years, needs of high density recording are extremely increased in order to record much more information on a magnetic tape. Concurrently therewith, there is a tendency that a width of a track in which magnetic information is recorded should be progressively decreased more than ever. Examples of track widths will be described. In the AIT4 tape format that is now commercially available, a track width is 4.4 µm and a magnetic tape recording and reproducing system corresponding to a narrower track width of 2 to 3 µm is now under examination.

A problem that encounters with introduction of a magnetic tape recording and reproducing system for recording and reproducing a magnetic tape having such a narrow track width is dispersions of heights with which a plurality of recording heads HW may be attached to the head attachment surface of the rotary drum 20.

More specifically, when the tape is originally transported at a predetermined tape transport speed, if the two recording heads HW1 and HW2 are attached to the proper positions of the rotary drum 20 having the head arrangement shown in FIG. 2, then widths of the magnetic patterns recorded on the track Tr1 and Tr2 are formed at an equal interval as shown in FIG. 3. However, if the recording heads HW1 and HW2 are different in height and they are not attached to the proper positions of the rotary drum 20, then the widths of magnetic patterns recorded on the tracks Tr1 and Tr2 are not formed at an equal interval, that is, the narrow tracks Tr1 and the wide tracks Tr2 are formed alternately as shown in FIG. 4, for example. For this reason, there is a risk that errors will be frequently detected from the narrow tracks Tr1 by an error detection process executed upon reproduction.

In order to cope with such situations, according to the related-art, a reproducing head is attached to an actuator formed of a suitable device such as a bimorph piezoelectric element and a moving coil and the height of the reproducing head is controlled by the actuator such that a reproduced signal may become an excellent reproduced signal obtained when information recorded on the tracks of the magnetic tape is reproduced by the reproducing head. However, in the magnetic tape recording and reproducing apparatus including the head driving mechanism with the actuator according to the related art, it has been customary that only the reproducing head is driven under control of the actuator while the recording head is separately fixed to the rotary drum without using the actuator.

More specifically, when the recording head HW is attached to and fixed to the rotary drum, it is customary to adjust the height of the recording head HW relative to the head attachment surface of the rotary drum. This height adjusting method will be described with reference to FIG. 5. As shown in FIG. 5, the other end side of a head attachment metal part 27 provided at one end of the recording head HW is fixed to the predetermined position of the rotary drum 20 by a head base fixing screw 28 in a cantilever fashion. Further, the height of the recording head HW may be adjusted by deforming the head attachment metal part 27 with a head height adjusting screw 29.

As described above, according to the related art, while the actuator is not provided on the recording head HW, the actuator is provided on the reproducing head HR. The reason for this will be described below. In the reproducing operation, even though tracks have substantially the same angles of inclination (azimuth angles), it becomes more difficult to stably obtain a reproduced signal as the width of the track is decreased more, and inclinations of angle of the tracks may not be negligible. Hence, it is necessary that the reproducing head should be controlled so as to follow the inclinations of angle of the tracks. For this reason, in the reproducing operation, the magnetic tape is reproduced by the reproducing head HR while the reproducing head HR is being displaced under control of dynamic tracking servo so that read errors generated at that time can be improved.

On the other hand, in the recording operation, even though information was already recorded on the tracks of the tape, since new information is overwritten on the tracks by the recording head and thereby new tracks are formed, it is not necessary to positively drive the recording head by the actuator and it is sufficient that the recording head should be fixed to the predetermined position of the rotary drum through adjustment.

Also, concerning the height adjustment of the recording head of the helical scan system magnetic tape recording and reproducing apparatus, there have hitherto been known technologies disclosed in Cited Patent Reference 1 and Cited Patent Reference 2.

First, the Cited Patent Reference 1 discloses a rotary drum apparatus that can be applied to a magnetic recording and reproducing apparatus such as a data recorder and a video tape recorder.

The rotary drum apparatus described in this Cited Patent Reference 1 includes a magnetic head height detecting device (displacement sensor) to measure a height of a magnetic head serving as a recording and reproducing magnetic head to thereby output measured results of height, a magnetic head height varying device (piezoelectric element and actuator) capable of varying the height of the magnetic head within a range of substantially one track pitch in response to a drive signal with respect to the rotary axis direction of the rotary drum and a driving unit for outputting a drive signal based on the height measured results obtained by the height detecting device. Then, particularly, in the final adjustment process, relative positional data obtained from the magnetic heads by using a predetermined reference tape is stored in a memory circuit, a relative height of the magnetic head is monitored and this relative height is held at a predetermined value based on the relative positional data stored in the memory circuit, thereby resulting in the height of the magnetic head mounted on the rotary drum being adjusted.

Also, the Cited Patent Reference 1 discloses a rotary drum apparatus for use with a helical scan system magnetic tape recording and reproducing apparatus and which includes a pair of piezoelectric bimorphs (actuators) symmetrically attached thereto around the axis of a rotary drum and more than one set of a pair of a set of recording and reproducing heads, each having an inverse azimuth angle relative to the pair of piezoelectric bimorphs, mounted along the outer peripheral surface of the rotary drum. Then, when magnetic information is recorded on the magnetic tape, this rotary drum apparatus may adjust the height of the other recording and reproducing head so as to agree with the reference height with references the head height of one recording and reproducing head of a pair of recording and reproducing heads.

More specifically, as shown in FIG. 6A, the magnetic tape recording and reproducing apparatus described in the Cited Patent Reference 2 may use the rotary drum 20 having the head arrangement shown in FIG. 2 and it may form a track Tr1 with one azimuth angle by the recording head HW1 and a track Tr2 with the other azimuth angle by the recording head HW2 substantially at the same time at tape transport speed of zero when the rotary drum is rotated once. Then, having started from this state, the magnetic tape recording and reproducing apparatus rotates the rotary drum 20 a plurality of times to cause the recording head HW1 to scan the track Tr2 in the direction shown by an arrow a in FIG. 6B and thus the track Tr2 is overwritten a plurality of times by the track Tr1. At that time, as shown in FIG. 6B, the height of the recording head HW1 is progressively changed by the actuator such that a width a may be decreased. Then, when only the reproduced signal of the track Tr1 with one azimuth angle is detected, it may be determined the two recording heads HW1 and HW2 are located at the proper positions.

[Cited Patent Reference 1]: Japanese Published Patent Application No. Hei 8-63730 (page 2, FIG. 1)

[Cited Patent Reference 2]: Japanese Published Patent Application No. 2001-184616 (page 2, FIGS. 1 and 16)

SUMMARY OF THE INVENTION

However, while the related-art magnetic tape recording and reproducing apparatus having the actuator provided on only the reproducing head is able to satisfactorily control the position of the reproducing head in the track width direction when the magnetic tape is reproduced, the width of the track to be formed is determined based on the attachment height of the recording head, that is, accuracy of mechanical dimension when the magnetic tape is recorded. This is caused by the fact that the recording head is fixed to the rotary drum.

In particular, as the width of the track to be recorded is decreased more in accordance with a demand of recording magnetic information on the magnetic tape at higher density, it is requested that the track width dimension accuracy of the adjacent tracks should become higher. Therefore, in the recording heads mechanically fixed to the rotary drum, adjustment of attachment heights of a plurality of recording head becomes a delicate work and it becomes difficult to maintain predetermined accuracy for a long period of time.

Then, even though the height of the recording head HW is adjusted by deforming the head attachment metal part 27 with the head height adjustment screw 29, it is difficult to manage and adjust the head height (head position in the track width direction) at accuracy of approximately ±0.1 µm. Even if head height can be adjusted on the production line, due to residual stress accumulated in the adjustment work done by the head adjustment screw 29, the head adjustment metal part 27 is unavoidably deformed by the change of circumstances such as temperature or the head adjustment metal part 27 is changed with time and positional displacement occurs. There is then a risk that defective products in the assembly process of the rotary drum 20 will be increased or that reliability of the magnetic tape recording and reproducing apparatus will be lowered.

Also, the system described in the Cited Patent Reference 1 in which the relative position of the magnetic head is monitored by the displacement sensor while the magnetic tape is being reproduced by using the exclusively-designed reference tape, the relative position of the magnetic head is made coincident with the final adjustment value by the actuator (piezoelectric element) needs the displacement sensor provided on the rotary drum to detect the head height and the cost of the apparatus is increased unavoidably. Also, since the adjustment reference tape is used, this system is advantageous in maintaining performance of the apparatus but there is a disadvantage that the user has to adjust the height of the magnetic head, which unavoidably imposes a large burden on the user.

Further, according to the related-art technology described in the Cited Patent Reference 2, the magnetic tape is recorded by the recording head at the magnetic tape transport speed of zero in the state in which rotation of the rotary drum is being controlled. If only the reproduced signal of the track having one azimuth angle is detected, it can be determined that the heights of a plurality of heads are in agreement with each other. This related-art system can be employed so long as a presupposition in which a track width and a reproduced signal have a linear relationship is established. However, in other heads such as an MR head using a magnetoresistive effect element (MR element) that is mainly used as a reproducing head for reproducing magnetic information recorded at high density, sensitivity in the head width direction is not uniform and the above-mentioned linear relationship is not established so that coincidence point of the head heights may not be detected clearly. There is then a disadvantage that it is not possible to use this system to adjust the positions of a plurality of MR heads.

In view of the aforesaid aspects, the present invention intends to provide a method of adjusting a recording head of a helical scan system magnetic tape recording and reproducing apparatus and a magnetic tape recording and reproducing apparatus which can be employed regardless of head elements, which may be advantageous in high density information recording and/or reproducing and which can maintain performance of the apparatus with ease.

In order to solve the above-described problems, according to the present invention, there is provided a method of adjusting a recording head of a helical scan system magnetic tape recording and reproducing apparatus for recording and/or reproducing data on and/or from a magnetic tape by n recording heads and m reproducing heads mounted on a rotary drum. This method of adjusting a recording head of a magnetic tape recording and reproducing apparatus includes a first process in which a plurality of tracks is formed on the magnetic tape by alternately supplying a measurement signal and an erasure signal to an i-th (i=1 to n) recording head of the n recording heads, tracks formed by the i-th recording head are reproduced by a j-th (j=1 to m) reproducing head of the m reproducing heads. A variable Ri optimum corresponding to a width of track formed by the i-th recording head is obtained from a reproduced signal obtained from the reproduction and n variables Ri optimum (i=1 to n) corresponding to the width of the track are sequentially obtained from a plurality of tracks formed by each of the n recording heads by repeating the above-mentioned operations n times. This method of adjusting a recording head of a magnetic tape recording and reproducing apparatus further includes a second process in which a plurality of tracks is formed on the magnetic tape by supplying a measurement signal to the n recording heads, tracks formed by the i-th (i=1 to n) recording head of the n recording heads are reproduced by the j-th reproducing head. A variable Ri now corresponding to a width of track formed by the i-th recording head is obtained from a reproduced signal obtained by the reproduction and n variables Ri now (i=1 to n) corresponding to the track width are sequentially obtained from a plurality of tracks formed by each of the n recording heads by repeating the above-mentioned operations n times. This method of adjusting a recording head of a magnetic tape recording and reproducing apparatus still further includes a third process in which the recording head is positioned such that a deviation $\Delta i$, $\Delta i = |Ri\ optimum - Ri\ now|$ (i=1 to n) obtained from the i-th track width variable Ri optimum obtained from the first process and the i-th track width variable Ri now obtained from the second process of the tracks formed by the i-th recording head becomes smaller than a desired value in all of the n recording heads.

Also, in the method of adjusting a recording head of a magnetic tape recording and reproducing apparatus according to the present invention, the erasure signal in the first process is recorded on adjacent tracks ahead of and behind the track at their areas adjacent to the measurement signal area relative to the track at its measurement signal area in which the measurement signal is recorded and the erasure signal has a signal frequency of which amplitude of an output waveform can be effectively regarded as zero in the outside of the band of the measurement signal.

In the method of adjusting a recording head of a magnetic tape recording and reproducing apparatus according to the present invention, the magnetic tape recording and reproducing apparatus uses a partial response system as transmission in the magnetic tape recording and reproducing apparatus, the erasure signal having a signal frequency of [channel clock frequency]/2.

According to the method of adjusting a recording head of a magnetic tape recording and reproducing apparatus having the above-mentioned arrangement, the measurement signal becomes an isolated signal of which recording area is substantially surrounded by recording areas of the erasure signal and recorded and one measurement signal having one azimuth angle is reproduced from a plurality of recorded tracks.

In the method of adjusting a recording head of a magnetic tape recording and reproducing apparatus according to the present invention, the track width variable Ri optimum (i=1 to n) in the first process is obtained from reproducing level characteristic of a j-th reproducing head in the m reproducing heads.

Also, in the method of adjusting a recording head of a magnetic tape recording and reproducing apparatus according to the present invention, the reproducing level characteristic is obtained from reproducing level of the measurement signal relative to the position at which the i-th reproducing head is placed in the track width direction.

Also, in the method of adjusting a recording head of a magnetic tape recording and reproducing apparatus according to the present invention, the reproducing head provided on an actuator fixed to the rotary drum is constructed such that it can be freely displaced in the track width direction of the magnetic tape by the actuator, the reproducing head reproduces the magnetic tape to obtain the reproducing level as an amplitude of a reproduced waveform of the measurement signal in the reproducing state or simultaneous recording and reproducing state of the magnetic tape while the reproducing head is being displaced in the track width direction.

According to the method of adjusting a recording head of a magnetic tape recording and reproducing apparatus having the above-mentioned arrangement of the present invention, in the first process, the reproducing head is positioned relative to the input voltage of the actuator such as the piezoelectric element. Then, the maximum amplitude of the reproduced waveform of the measurement signal having one azimuth angle reproduced at this reproducing head position can be measured as reproducing level. Therefore, it is possible to obtain reproducing level characteristic in the i-th recording head by calculating the change of the reproducing level relative to the input voltage of the actuator.

Then, a variable Ri optimum corresponding to the track width is defined as the reproducing level characteristic in this i-th recording head by expediently using a half (full) width and this variable Ri optimum (i=1 to n) can be used as a parameter for adjustment by calculating the variable Ri optimum (i=1 to n) with respect to each of n recording heads. The thus obtained reproducing level characteristic is obtained from only one measurement signal in a plurality of erasure signals and hence the value of the variable Ri optimum can correspond to the track width with high accuracy.

Also, in the method of adjusting a recording head of a magnetic tape recording and reproducing apparatus according to the present invention, the track width variable Ri now (i=1 to n) in the second process is obtained from reproducing level characteristic of a j-th reproducing head in the m reproducing heads.

Also, in the method of adjusting a recording head of a magnetic tape recording and reproducing apparatus according to the present invention, the reproducing level characteristic is obtained from reproducing level of the measurement signal relative to the position at which the j-th reproducing head is placed in the track width direction.

According to the method of adjusting a recording head of a magnetic tape recording and reproducing apparatus having the above-mentioned arrangement, in the second process, the measurement signals are recorded on a plurality of tracks by n recording heads substantially the same time. Then, the reproducing head may be properly positioned relative to the input voltage of the actuator and the maximum amplitude of a reproduced waveform of the measurement signal having one azimuth angle reproduced at this reproducing head position can be measured as the reproducing level.

Then, the change of the reproducing level relative to the input voltage of the actuator can be detected from the tracks formed by n recording heads.

For this reason, the reproducing level characteristic in the i-th recording head is obtained, the variable Ri now corresponding to the track width is defined by expediently using the half width as the reproducing level characteristic and the variables Ri now (i=1 to n) of each of n recording heads is calculated, whereby this variable Ri now (i=1 to n) can be used as adjustment parameter. Since the reproducing level characteristic obtained herein is obtained from each of a plurality of measurement signals recorded on the tracks with different azimuth angles, the variable Ri now can be selected as a value corresponding to each track width.

Also, in the method of adjusting a recording head of a magnetic tape recording and reproducing apparatus according to the present invention, positioning of the recording head in the third process is carried out such that the i-th recording head is positioned at the position if $-\Delta_{2i} \leq $ Ri optimum$-$Ri now $\leq \Delta_{1i}$ is satisfied with respect to the track width variable Ri optimum (i=1 to n) obtained in the first process and the track width variable Ri now (i=1 to n) obtained in the second process where $\Delta_{1i}$ and $\Delta_{2i}$ ($0<\Delta_{2i}$, $0<\Delta_{1i}$) are deviations. An actuator corresponding to the i-th recording head is driven in the direction in which the track width variable becomes larger than the track width variable Ri now of the point of time so that the i-th recording head is positioned if Ri optimum$-$Ri now $<-\Delta_{2i}$ is satisfied and that an actuator corresponding to the i-th recording head is driven in the direction in which the track width variable becomes smaller than the track width variable Ri now of the point of time so that the i-th recording head is positioned if $\Delta_{1i}<$Ri optimum$-$Ri now is satisfied.

According to the method of adjusting a recording head of a magnetic tape recording and reproducing apparatus having the above-mentioned arrangement of the present invention, the variables Ri optimum (i=1 to n) corresponding to the n track widths obtained from n isolated measurement signals respectively corresponding to n recording heads obtained in the first process and the variables Ri now (i=1 to n) corresponding to the n track widths obtained from the n measurement signals recorded substantially simultaneously by the n recording heads obtained in the second process are used. In the third process, the variables Ri optimum are used as reference variables the recording head is displaced in the track width direction while the variables Ri now (i=1 to n) are being measured again and processing at the second and third processes is repeated so that the deviations $\Delta_{1i}$ and $\Delta_{2i}$ can be controlled so as to fall within the predetermined ranges. Therefore, it is possible to adjust the recording heads to have proper heights without separately preparing other devices such as a reference tape.

Also, in the method of adjusting a recording head of a magnetic tape recording and reproducing apparatus according to the present invention, the magnetic tape includes a data pre-recorded area outside of which tracks to record the measurement signal and the erasure signal in the first process and tracks to record the measurement signal are formed.

According to the method of adjusting a recording head of a magnetic tape recording and reproducing apparatus having the above-mentioned arrangement of the present invention, since it is sufficient that the data recording and reproducing areas which are used to calculate the variables Ri optimum and Ri now corresponding to the track widths may have lengths of approximately 10 seconds at most in the standard tape transport state, the area at the tape top or the tape end can be used effectively to adjust the position of the recording head.

In order to solve the above-described problems, according to the present invention, there is provided a helical scan system magnetic tape recording and reproducing apparatus for recording and/or reproducing data on and/or from a magnetic tape by n recording heads and m reproducing heads mounted on a rotary drum. A magnetic tape recording and reproducing apparatus includes a unit for alternately supplying a measurement signal and an erasure signal to an i-th (i=1 to n) recording head of the n recording heads to form a plurality of tracks on the magnetic tape. This magnetic tape recording and reproducing apparatus further includes a unit for reproducing a track formed by the i-th recording head by a j-th (j=1 to m) reproducing head of the m reproducing heads, obtaining a variable Ri optimum corresponding to a width of a track formed by the i-th recording head from a reproduced signal obtained by the reproduction and sequentially measuring n variables Ri optimum (i=1 to n) corresponding to a width of the track from a plurality of tracks formed by each of the n recording heads by repeating the above operation n times. The magnetic tape recording and reproducing apparatus yet further includes a unit for forming a plurality of tracks on the magnetic tape by supplying a measurement signal to the n recording heads, reproducing a track formed by the i-th recording head (i=1 to n) of the n recording heads by the j-th (j=1 to m) reproducing head of the m reproducing heads. This unit further calculates a width of a track formed by the i-th recording head from a reproduced signal obtained by the reproduction and sequentially measuring n variables Ri now (i=1 to n) corresponding to the track width from a plurality of tracks formed by each of the m reproducing heads by repeating the above operation n times. This magnetic recording and reproducing apparatus still further includes a unit for displacing the recording head in the track width direction by an actuator provided on the rotary drum such that n deviations between the variable Ri optimum and, the variable Ri now become smaller than a desired value.

According to the magnetic tape recording and reproducing apparatus having the above-mentioned arrangement of the present invention, the recording heads can be displaced in the track width direction by the actuators and the deviation between the variables Ri optimum and Ri now (i=1 to n) of track widths can be adjusted so as to fall within the desired range. Thus, it is possible to constantly hold the recording heads at proper heights without user's help.

According to the method of adjusting a recording head of a magnetic tape recording and reproducing apparatus of the present invention, the recording heads can be adjusted to the proper heights by only preparing the arbitrary magnetic tape that can be set to the recordable state. Also, substantially equal tracks can be formed without separately preparing a suitable device such as a reference tape although such tracks are narrow in width. Therefore, not only recording density can be improved but also the proper positions of the recording heads can be maintained and adjusted easily.

According to the magnetic tape recording and reproducing apparatus of the present invention, it is possible to adjust the recording heads at the proper positions by using the arbitrary magnetic tape that can be set to the recordable state without user's help and stable recording and reproducing performance can be maintained.

BRIEF DESCRIPTION OF THE DRAWINGS

FIGS. 12A, 12B and 12C are respectively diagrams showing examples of output characteristics (track profiles) of reproducing signal levels relative to off-track amounts of the reproducing heads, wherein FIG. 12A shows an example of a track profile obtained when a track width is proper, FIG. 12B shows an example of a track profile obtained when a track width is small and FIG. 12C shows an example of a track profile obtained when a track width is large;

FIGS. 20A, 20B and 20C are respectively diagrams showing magnetic patterns on magnetic surfaces of tracks formed by only one recording head in the example shown in FIG. 19, wherein FIG. 20A shows an example of a single azimuth angle recording, FIG. 20B shows an example in which a measurement signal or an erasure signal is recorded at every track and FIG. 20C shows an example in which the measurement signal and the erasure signal are recorded on one track in a mixed state;

FIGS. 22A and 22B are flowcharts the track forming process of the first half of the first process of the example shown in FIG. 16, wherein FIG. 22A shows a [flowchart u1] to which reference will be made in explaining a process to calculate a width of a track formed by only a recording head HW1 and FIG. 22B shows a [flowchart u2] to which reference will be made in explaining a process to calculate a width of a track formed by only a recording head HW2, respectively;

FIGS. 23A and 23B are flowcharts showing processes to calculate variables of track width in the second half of the first process of the example shown in FIG. 16, wherein FIG. 23A shows a [flowchart v1] to which reference will be made in explaining a process to calculate a width of a track formed by only the recording head HW1 and FIG. 23B shows a [flowchart v2] to which reference will be made in explaining a process to calculate a width of a track formed by only the recording head HW2, respectively;

FIGS. 25A and 25B are flowcharts showing processes to calculate variables of track width in the second half of the second process of the example shown in FIG. 17, wherein FIG. 25A shows a [flowchart y1] to which reference will be made in explaining a process to calculate a width of a track formed by the recording head HW1 and FIG. 25B shows a [flowchart y2] to which reference will be made in explaining a process to calculate a width of a track formed by the recording head HW2, respectively;

FIG. 27 is a flowchart following the flowchart of FIG. 26, that is, a flowchart showing second and third processes of the [flowchart D] in which the position of the recording head is calibrated.

DESCRIPTION OF THE PREFERRED EMBODIMENTS

A method of adjusting a recording head of a magnetic tape recording and reproducing apparatus and a magnetic tape recording and reproducing apparatus according to the embodiments of the present invention will now be described below with reference to FIGS. 1 to 27.

Also, a magnetic tape recording and reproducing apparatus according to the embodiments of the present invention is of the helical scan system magnetic tape recording and reproducing apparatus, and it is customary that n recording heads and m reproducing heads are attached to a rotary drum of the magnetic tape recording and reproducing apparatus.

Then, any one of the m reproducing heads corresponds to each of the n recording heads in a one-to-one correspondence fashion. Accordingly, an inequality of n≦m is established and n reproducing heads of m reproducing heads correspond to n recording heads in a one-to-one correspondence fashion.

In order to simplify explanations, let us describe the following specific example on the assumption that two recording head and two reproducing heads should be mounted on the rotary drum.

First, the following presuppositions (a) to (d) will be described.

Figure 2:
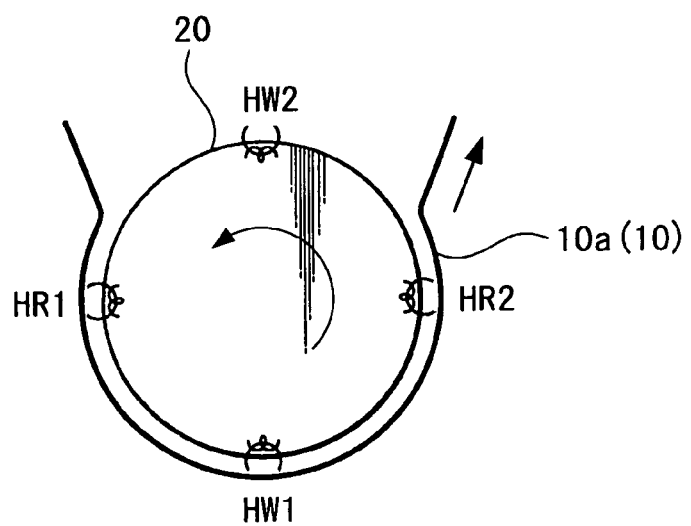
FIG. 2 is a schematic diagram useful for explaining recording heads mounted on a rotary drum of the magnetic tape recording and reproducing apparatus of the example shown in FIG. 1.

(a): HW1 and HW2 assume recording heads and HR1 and HR2 assume reproducing heads, respectively. These recording heads HW1, HW2 and reproducing heads HR1, HR2 are attached to the rotary drum 20 at an interval of 90 degrees each relative to the rotation center of the rotary drum 20 as shown in FIG. 2. Herein, suffixes 1 and 2 may express azimuth angles different from each other. It should be noted that a suffix i (i=1 to n) should be used to generally explain the n recording heads and that a suffix j (j=1 to m) should be used to generally explain the m reproducing heads.

(b): A track recorded by the recording head HW1 is reproduced by the reproducing head HR1 and a track recorded by the recording head HW2 is reproduced by the reproducing head HR2.

(c): The recording heads HW1, HW2 and the reproducing heads HR1, HR2 are attached to tip end portions of actuators. The recording heads HW1, HW2 and the reproducing heads HR1, HR2 are attached to the rotary drum 20 in such a manner that they may be displaced in the track width direction (in the upper direction in FIG. 4) when a forward direction voltage is applied to the actuators. The direction in which the tracks formed at that time are displaced is the upper right direction at a right angle with respect to the track as shown by an arrow β in FIG. 4.

(d): Capstan servo control to transport a magnetic tape in the tracking reproducing operation may be a well-known CTL servo system carried out based on a CTL (control) track formed on the tape at the same time magnetic information is recorded and a head switching pulse generated in accordance with rotation of the rotary drum.

First, an outline of a magnetic tape recording and reproducing apparatus according to the embodiment of the present invention will now be described with reference to FIGS. 1, 2, 7, 8, 9, 10, 11A, 11B, 12A, 12B, 12C, 13A, 13B, 13C, 14 and 15.

Figure 7:
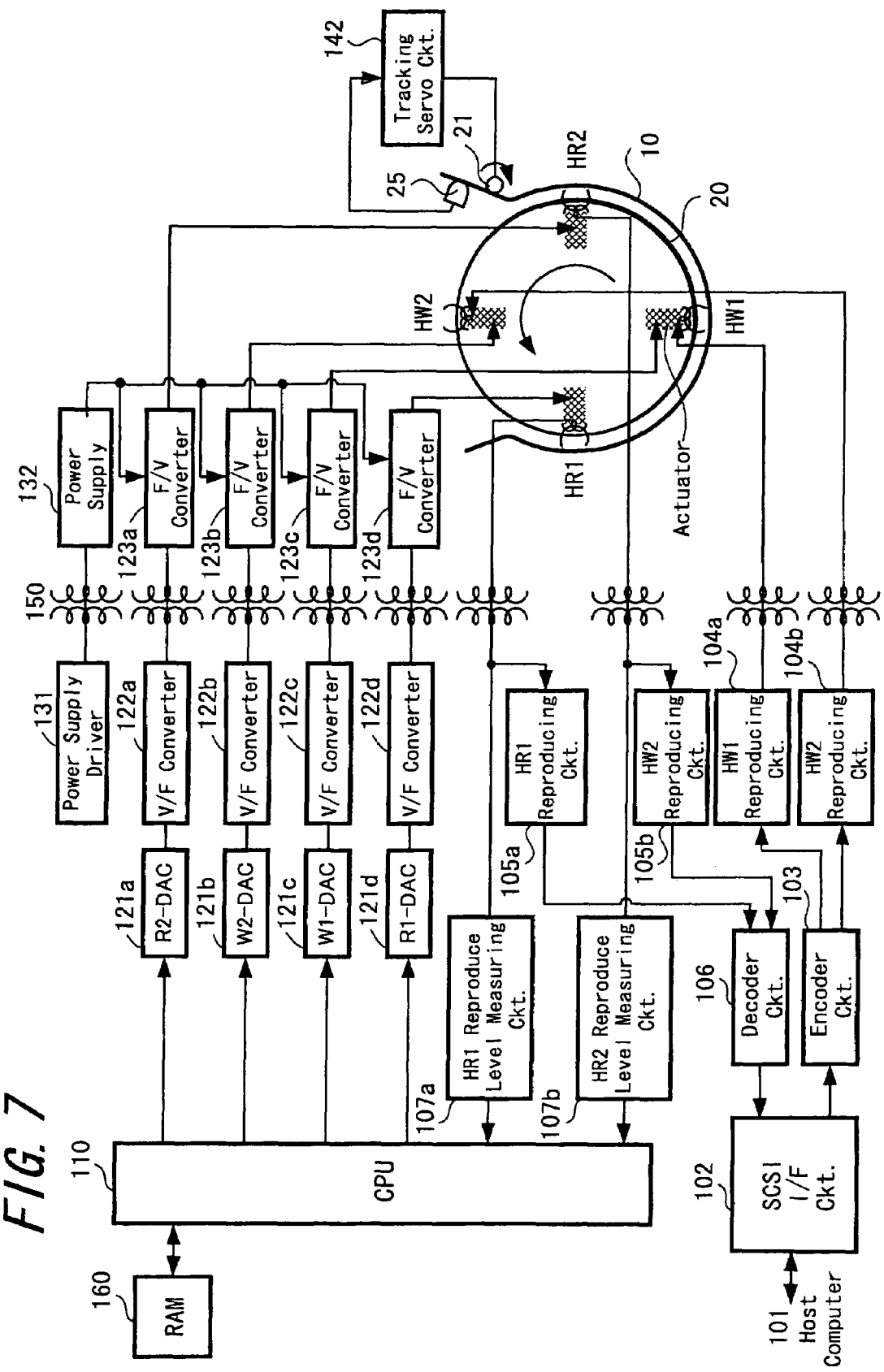
FIG. 7 is a block diagram of a system arrangement of a recording and reproducing unit showing a magnetic tape recording and reproducing apparatus according to an embodiment of the present invention.

FIG. 7 is a block diagram showing a system arrangement of a recording and reproducing unit of a magnetic tape recording and reproducing apparatus 1 according to the embodiment of the present invention. As shown in FIG. 7, a recording data signal transmitted from a host computer 101 is received by the magnetic tape recording and reproducing apparatus 1 through a SCSI (small computer systems interface) interface circuit 102. Then, this recording data signal is converted into a recording analog signal by an encoder circuit 103, waveform-shaped in a predetermined manner by an HW1 recording circuit 104a and an HW2 recording circuit 104b and recorded on a tape 10 by the recording heads HW1 and HW2 attached to the rotary drum 20 through a rotary transformer (RT) 150.

On the other hand, reproduced signals from the reproducing heads HR1 and HR2 attached to the rotary drum 20 are respectively supplied to an HR1 reproducing circuit 105a and an HR2 reproducing circuit 105b, in which they are amplified, equalized and detected, whereafter they are decoded to reproducing data in the form of a digital signal by a decoder circuit 106 and transmitted from the SCSI interface circuit 102 to the host computer 101.

Also, the reproduced signals obtained from the reproducing heads HR1 and HR2 are also used in order to drive and control actuators, which will be described later on. Amplitude values of signal waveforms reproduced by an HR1 reproducing level measuring circuit 107*a* and an HR2 reproducing level measuring circuit 107*b* are converted in the form of analog to digital signals and resultant digital signals are transmitted to a CPU (central processing unit) 110.

Also, the CPU 110 includes a RAM (random-access memory) 160 as a storage area to store data and the like.

In the embodiment of this invention, the HR1 reproducing level measuring circuit 107*a* and the HR2 reproducing level measuring circuit 107*b* extract amplitudes (reproducing levels) of reproduced waveforms, at substantially the center of the track, of a series of signal waveforms reproduced during the tracks are scanned and convert the thus extracted amplitudes in the form of analog to digital data.

Signals to drive and control the actuators to which the recording heads HW1, HW2 and the reproducing heads HR1, HR2 are attached are outputted from the CPU 110 to a DAC (digital-to-analog converter) circuit 121 (R2-DAC 121*a*, W2-DAC 121*b*, W1-DAC 121*c* and R1-DAC 121*d*) as a control signal to supply a desired driving voltage to the actuator. Then, this control signal is D/A converted into an analog signal by the DAC circuit 121. This analog signal is converted into a signal with a predetermined frequency by a V/F (voltage-to-frequency) converting circuit 122 (V-F converting circuits 122*a* to 122*d*). After that, this converted signal from the V/F converting circuit 122 is supplied through the rotary transformer 150 to a F/V (frequency-to-voltage) converting circuit 123 (F/V converting circuits 123*a* to 123*d*), in which it is converted and restored to a control signal to drive and control the actuator.

Figure 8:
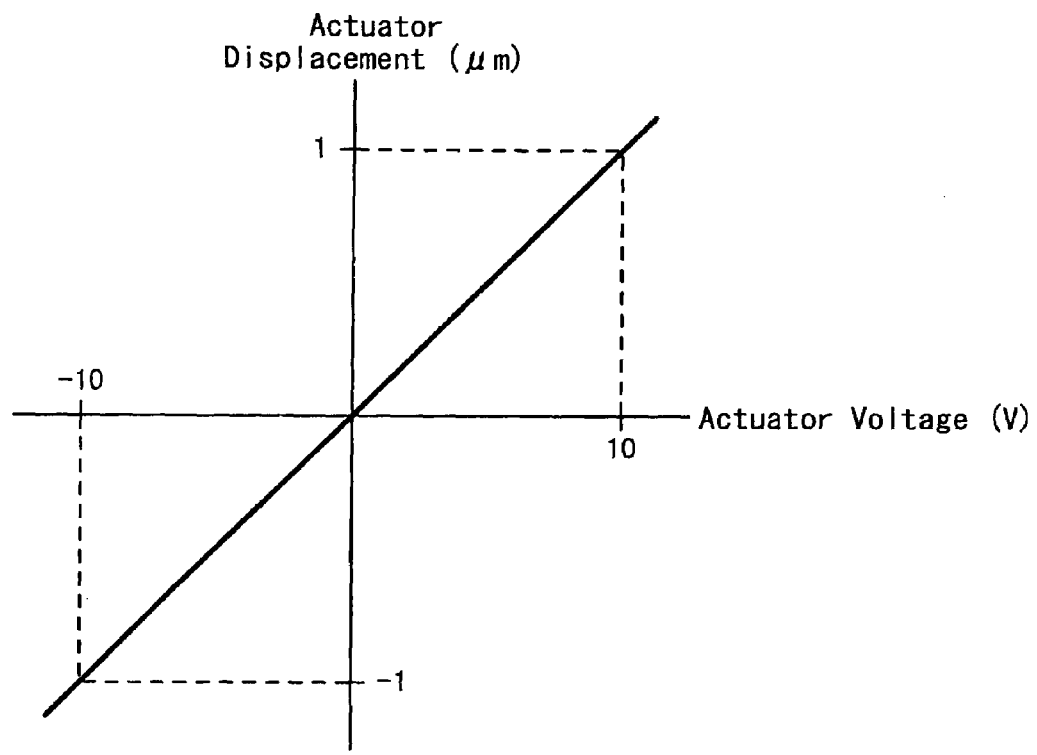
FIG. 8 is a diagram showing output characteristics of an example of an actuator used in a magnetic tape recording and reproducing apparatus according to the embodiment of the present invention.

Then, a voltage supplied from a power supply driver 131 through the rotary transformer 150 to a power supply 132 is converted by a control signal and a desired driving voltage is supplied to each of the actuators. It should be noted that the V/F converting circuit 121 and the F/V converting circuit 123 are used at the same time because the rotary transformer 150 is not able to transmit a DC voltage. Also, the actuator has characteristics such as those of a piezoelectric element in which a voltage is changed with a displacement amount, and the actuator having an output characteristic of approximately 1 μm/10V as shown in FIG. 8 may be used in the embodiment of the present invention. The details of this actuator will be described later on.

Also, as shown in FIG. 7, in the magnetic tape recording and reproducing apparatus 1, at the same time magnetic information is recorded on the tracks by the recording heads HW1 and HW2, a CTL (control) track is recorded on the tape 10. Then, in the reproducing operation, the CTL track on the tape 10 is detected by a CTL head 25 and a tape transport speed of the tape 10 is adjusted by using a capstan 21 (FIG. 1) provided at a rotary shaft based on a thus obtained CTL track signal and a head switching pulse (PG pulse) generated in accordance with rotation of the rotary drum 20. The tape transport speed of the tape 10 may be adjusted by controlling rotating speed of a capstan motor 51 based on a control signal outputted from a tracking servo circuit 142.

Next, the tape transport of the tape 10 in the helical scan system magnetic tape recording and reproducing apparatus 1 according to the embodiment of the present invention and scanning operations of the recording heads HW1, HW2 and the reproducing heads HR1, HR2 on the tape 10 will be described with reference to FIG. 2.

FIG. 2 shows the rotary drum 20 of the magnetic tape recording and reproducing apparatus 1 according to the embodiment of the present invention. As shown in FIG. 2, the recording heads HW1, HW2 and the reproducing heads HR1, HR2 are attached to this rotary drum 20 and the tape 10 is wrapped around the rotary drum 20 helically (spirally).

Figure 3:
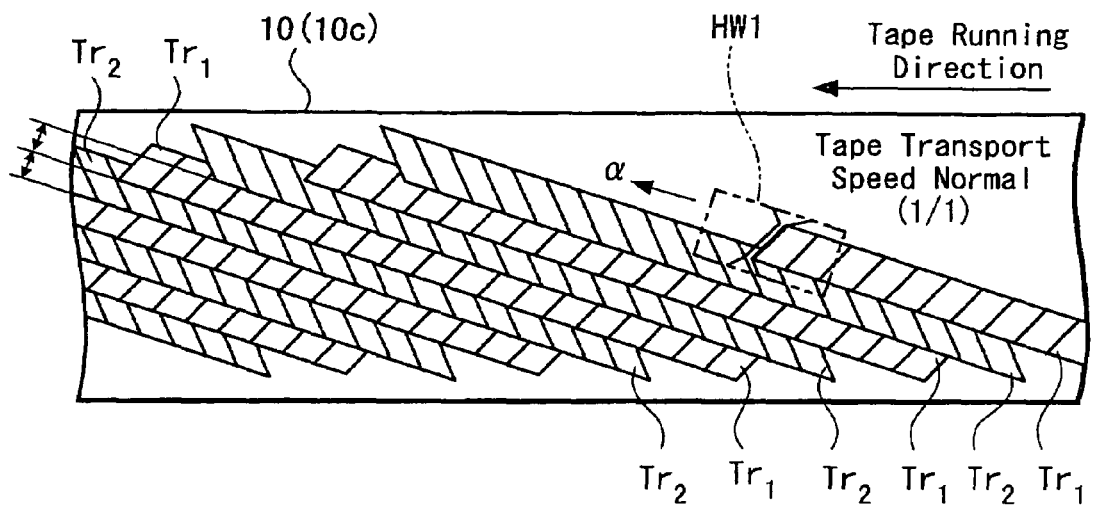
FIG. 3 is a schematic diagram used to explain magnetic patterns of a magnetic surface formed on the magnetic tape by two recording heads of the magnetic tape recording and reproducing apparatus shown in the example of FIG. 2 (appropriate head positions)

Then, the rotary drum 20 is rotated by a drum motor 50 so that the recording heads HW1, HW2 and the reproducing heads HR1, HR2 may scan the tape 10 transported at a constant speed from the oblique direction as shown in FIG. 3. Consequently, magnetic information (tracks Tr1, Tr2, Tr1, Tr2, . . . ) shown in FIG. 3 are recorded on the tape 10 by the recording heads HW1, HW2 and the thus recorded magnetic information are read out (reproduced) from the tape 10 by the reproducing heads HR1, HR2.

At that time, the magnetic information recorded by the recording head HW1 is reproduced by the reproducing head HR1 and the magnetic information recorded by the recording head HW2 is reproduced by the reproducing head HR2.

Herein, the reproducing head HR1, the recording head HW1 and the reproducing head HR2, the recording head HW2 are attached to the rotary drum 20 with substantially the same height so as to become symmetric with respect to the rotary axis of the rotary drum 20 in such a manner that they may draw substantially the same trajectories (see FIG. 2) when this rotary drum 20 is rotated around the axis at a constant rotating speed.

Figure 1:
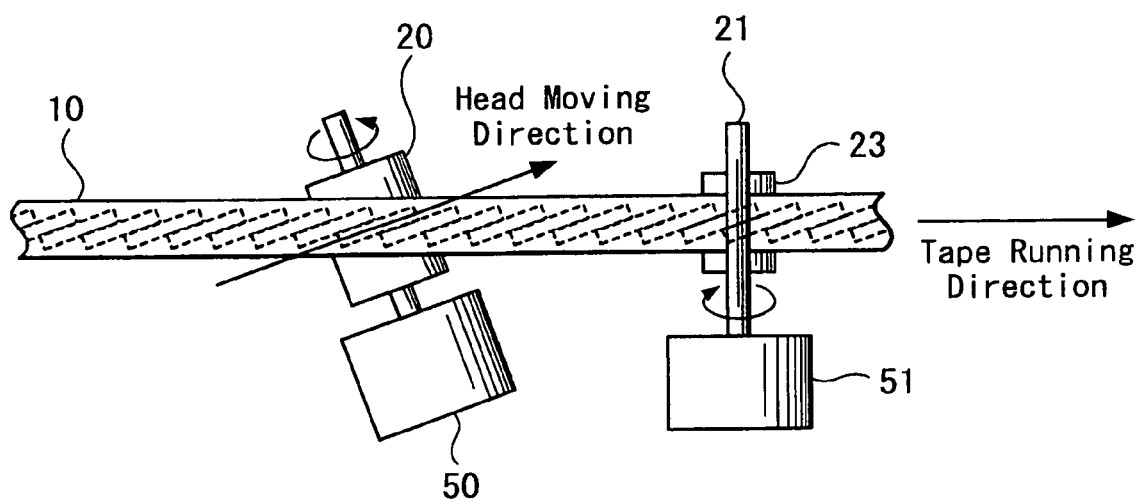
FIG. 1 is a schematic diagram useful for explaining tape transport of a magnetic tape and tracks formed on a magnetic tape in a magnetic tape recording and reproducing apparatus.

Also, the tape 10 is transported in the state in which it is sandwiched by a pinch roller 23 and the capstan 21 as the capstan 21 is rotated by the capstan motor 51 as shown in FIG. 1. At that time, during the tape transport operation in the reproducing mode, as shown in FIG. 9, a tape transport speed is adjusted by tracking servo such that a running trajectory α1 of the reproducing head HR1 (or HR2) may trace substantially the central line of the track Tr (the tape 10 is transported in on-track state).

Then, in the head arrangement shown in FIG. 2, in the standard operation mode in which the normal tape transport speed of the tape 10 and the rotating speed of the rotary drum 20 are predetermined values under control, the recording had HW1 and the reproducing head HR1 may scan the area of the track Tr1 shown in FIG. 3 during 0.5 rotation of the first half of one rotation of the rotary drum 20, for example, and the recording head HW2 and the reproducing head HR2 may scan the area of the track Tr2 shown in FIG. 3 during 0.5 rotation of the second half of one rotation of the rotary drum 20. In the end, the two tracks Tr1 and Tr2 may be scanned substantially simultaneously during one rotation of the rotary drum 20.

Consequently, the tracks Tr1 and Tr2 are formed on the areas scanned by the recording heads HW1 and HW2 to record magnetic information and the reproducing heads HR1 and HR2 scan the tracks Tr1 and Tr2 on which magnetic information were recorded to reproduce recorded magnetic information. At that time, new magnetic information can be recorded and data reproduction (read after write (simultaneous recording and reproduction) for confirming whether or not information was recorded correctly can be carried out with very small shift of timing.

Figure 9:
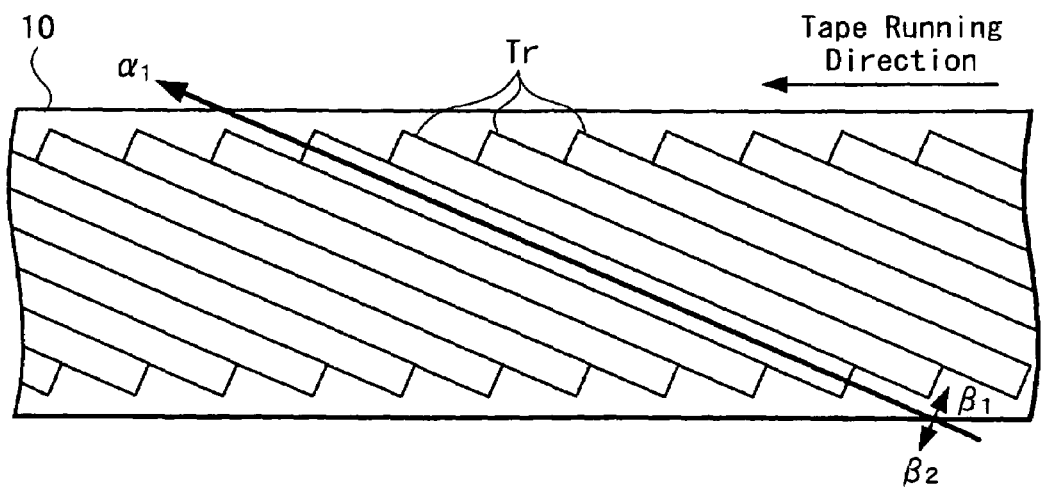
FIG. 9 is a diagram used to explain the state in which head trajectories of the reproducing heads on the tracks are in the on-track state.
Figure 10:
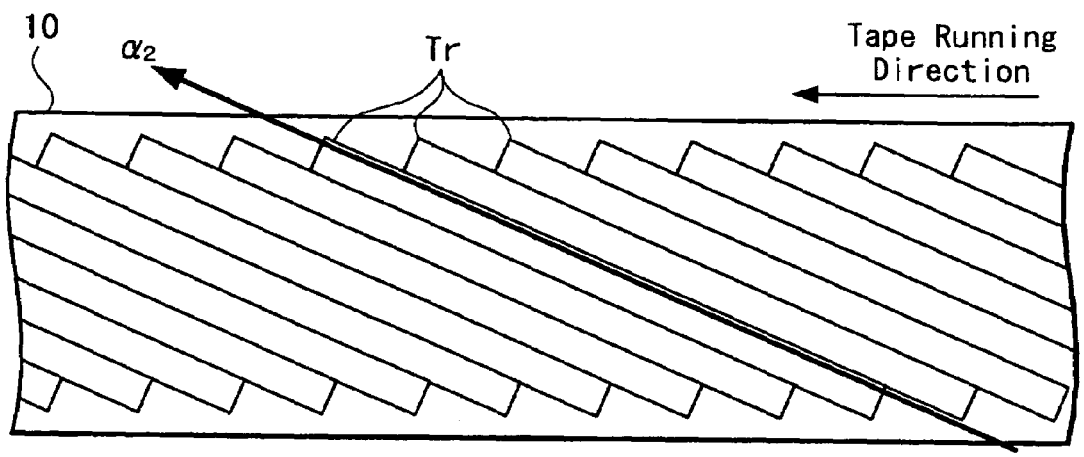
FIG. 10 is a diagram used to explain the state in which head trajectories of the reproducing heads on the tracks are in the off-track state.

In the helical scan system in which the tape 10 is helically wound around the rotary drum 20 and in which the rotary heads scan this tape 10, running situations of the reproducing heads HR1 and HR2 are roughly classified as a case (trajectory α1) in which the reproducing heads HR1 and HR2 scan substantially the central line of the above-mentioned track Tr shown in FIG. 9 in the on-track state and a case (trajectory α2) in which the reproducing heads HR1 and HR2 scan the area straying from the central line of the track Tr in the off-track state shown in FIG. 10.

Figure 11A:
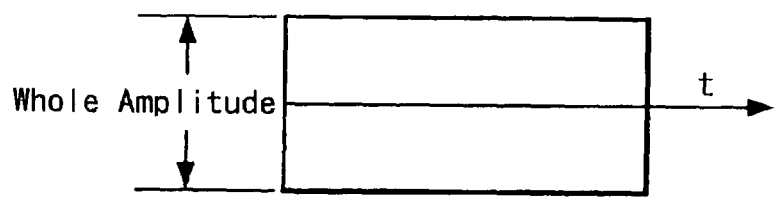
FIG. 11A is a diagram showing a reproducing signal envelope obtained from an envelope of an amplitude of a reproduced waveform of a reproduced signal in the state in which the reproducing heads are placed in the on-track state.
Figure 11B:
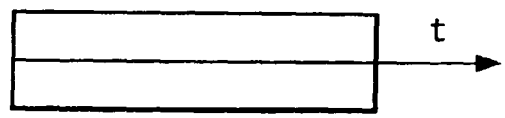
FIG. 11B is a diagram showing a reproducing signal envelope obtained from an envelope of an amplitude of a reproduced waveform of a reproduced signal in the state in which the reproducing heads are placed in the off-track state.

FIGS. 11A and 11B are diagrams showing reproduced signal envelopes obtained when a track width measuring reference tape (hereinafter referred to as a "reference tape") $10a$ in which tracks having different azimuth angles are alternately recorded with an equal track width in advance. FIG. 11A shows a reproduced signal envelope obtained when the reproducing heads are running in the on-track state and FIG. 11B shows a reproduced signal envelope obtained when the reproducing heads are running in the off-track state.

The reproduced signal envelopes may show measured results obtained when the envelopes of the reproduced signals obtained from the vertex (full amplitude) of the reproduced signal waveforms are approximated by rectangles where the horizontal axis represents a time t. A study of FIGS. 11A and 11B reveals that, even when tracks on which substantially the same magnetic information are recorded are reproduced, the amplitude level of the reproduced signal of the reproduced signal envelope obtained in the off-track running state shown in FIG. 11B can be lowered considerably as compared with the amplitude level of the reproduced signal of the reproduced signal envelope obtained in the on-track running state shown in FIG. 11A. Also, it is to be understood that there is a risk that recorded magnetic information will not be reproduced if the off-track amount is increased.

Figure 12A:
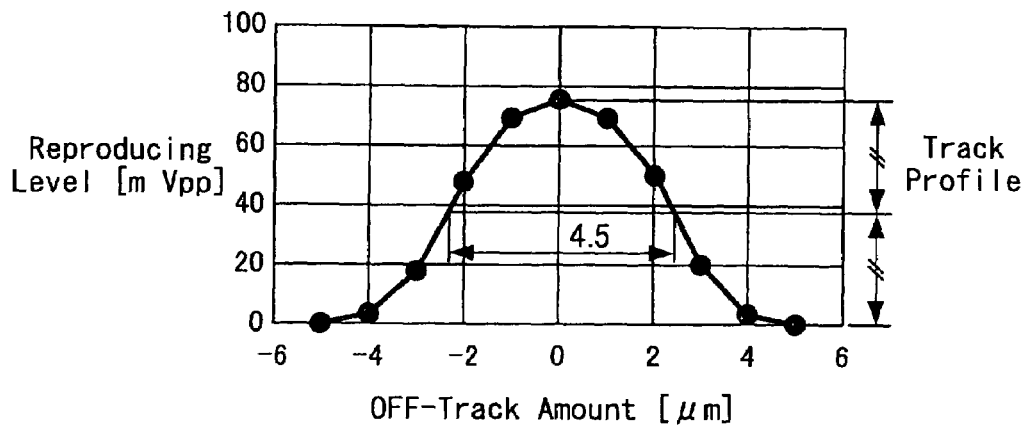
Figure 12B:
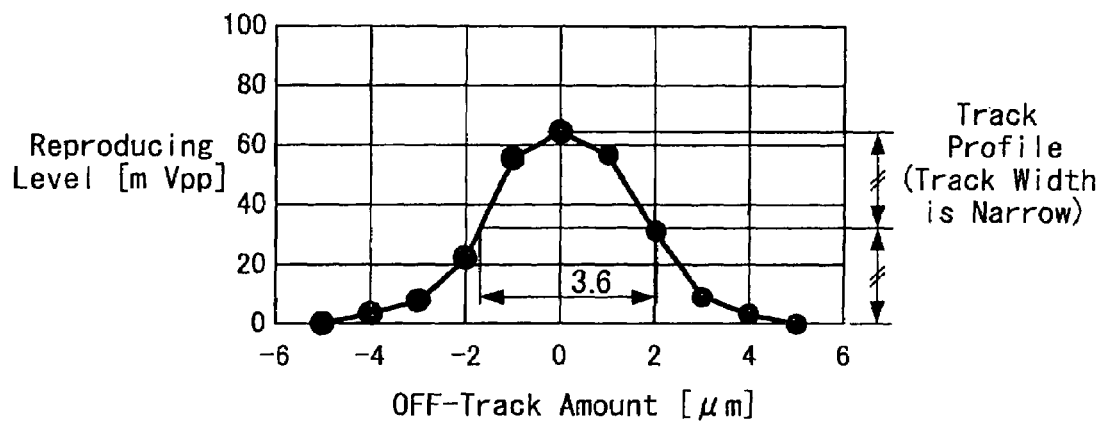
Figure 12C:
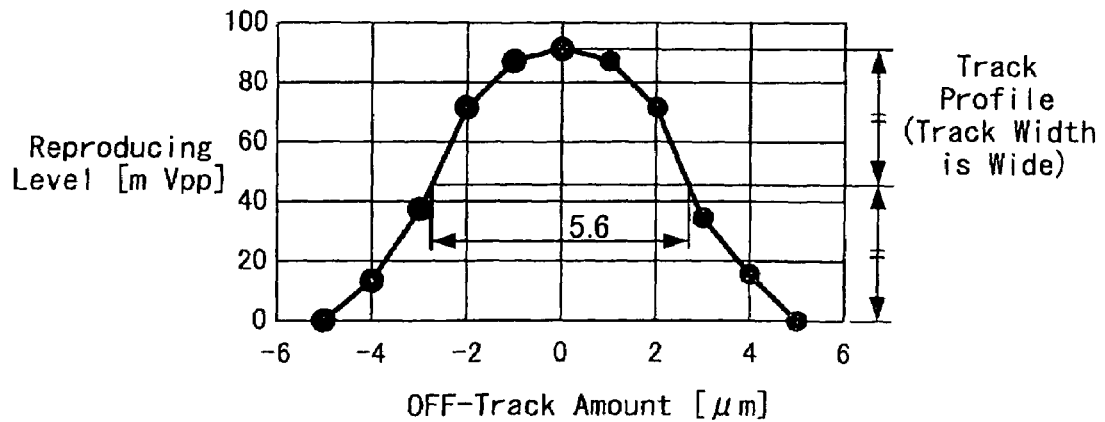

FIGS. 12A, 12B and 12C are diagrams showing amplitudes of reproduced signal waveforms relative to off-track amounts of reproducing heads, respectively. The state of the trajectory α1 in which the reproducing head is running at the on-track reproducing head position (center of track) shown in FIG. 9 is used as the standards by which the reproducing head HR is slightly displaced in the width directions (directions β1 and β2 of FIG. 9) of the tracks Tr. Then, the displacement of the amplitude of the reproduced signal waveform obtained at that time was calculated and "reproducing level" (mV peak-to-peak) characteristic, which is the amplitude of the reproduced signal waveform relative to "off-track amount" (μm) of the reproducing head HR from the central line of the track, was calculated.

A characteristic diagram of "reproducing level" relative to the position of the track width direction of this reproducing head HR will hereinafter be referred to as a "track profile". "Reproducing levels" may have mountain-like distributions of which top is the position at which the reproducing head HR1 (or HR2) is placed in the on-track state (FIG. 9) (that is, off-track amount is 0 μm) as shown in FIGS. 12A, 12B and 12C. In general, half width is used to expediently determine characteristic values in characteristic curves which may have mountain-like distributions. The idea of this half width is applied to FIGS. 12A, 12B and 12C and hence a "half width (full width at half maximum)" corresponding to ½ of a value (maximum value) obtained at the top when the off-track amount is 0 μm is to be defined as a "track width".

It should be noted that previously-determined coefficients such as 0.4 width and 0.6 width may be used and defined as track widths instead of the half width (0.5) similarly as described above.

Having defined the track width as described above and having examined half widths with reference to FIGS. 12A, 12B and 12C, half width≈4.5 μm can be read from a track profile shown in FIG. 12A, half width≈3.6 μm can be read from a track profile of a narrow width shown in FIG. 12B and half width≈5.6 μm can be read from a track profile of a wide track shown in FIG. 12C.

Then, by reading half widths from drawn track profiles, it is possible to measure track widths recorded on the tape although track widths are to be measured indirectly and it is possible to quantitatively determine whether the track width is wide or narrow.

Since the track profiles may be obtained by measuring the amplitude (reproducing level) of the reproduced waveform while the reproducing head HR1 (or HR2) is being displaced and moved so as to cross the tracks in the directions shown by the arrows β1 and β2 in FIG. 9, it is necessary to displace the reproducing head HR1 (or HR2) in the track width direction. The reproducing head may be displaced in the track width direction by using the actuator shown in FIGS. 13A, 13B and 13C attached to the reproducing head HR1 (or HR2) as was already set forth in the presupposition (c).

Next, the arrangement of the head which can be freely displaced in the track width direction by the actuator will be described with reference to FIGS. 13A, 13B and 13C.

Figure 13C:
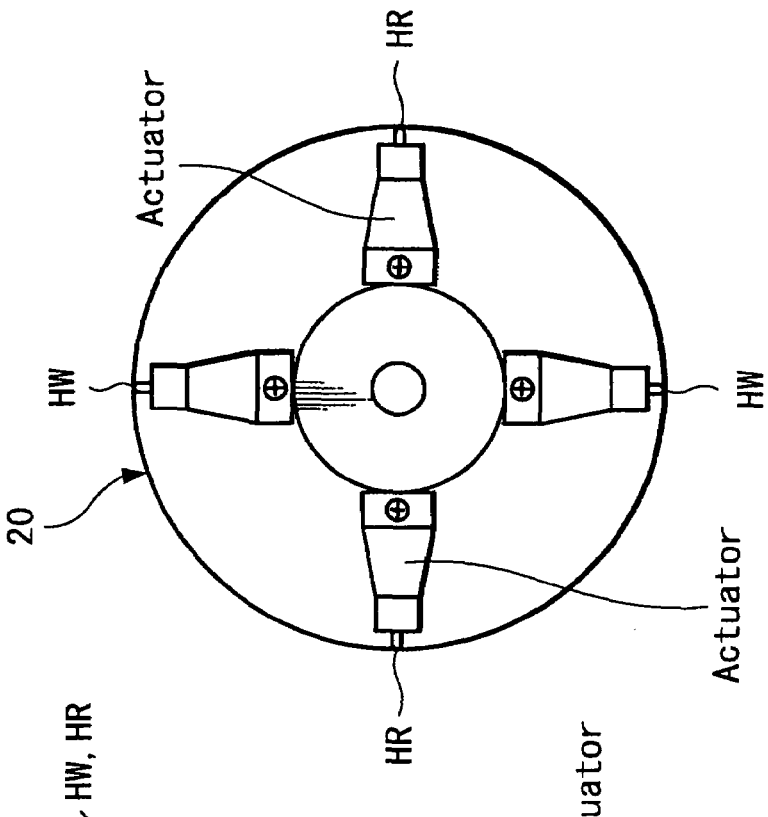
FIG. 13C is a diagram used to explain the state in which the heads having the actuators are attached to a rotary drum.
Figure 13B:
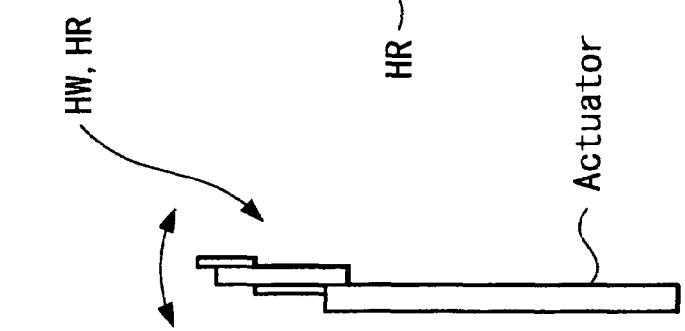
FIG. 13B is a side view showing examples of heads including actuator.
Figure 13A:
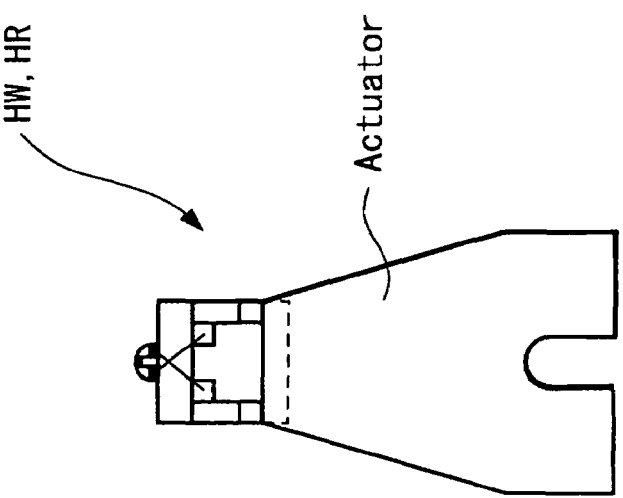
FIG. 13A is a front view showing examples of heads including actuators.

While the reproducing heads HR1 and HR2 are attached to the tip end portion of the actuator as shown in FIGS. 13A, 13B and 13C, the actuator itself may be displaced in response to polarity and magnitude of control voltage with application of a control voltage to electrodes provided on the surface and back of this actuator. Then, as this actuator is displaced, the reproducing heads HR1 and HR2 can be displaced in the directions shown by arrows in FIG. 13B. More specifically, as shown in FIG. 13C, the reproducing heads HR1 and HR2 are attached to the rotary drum 20 through the other end of the actuators and thereby the reproducing heads HR1 and HR2 can be displaced in the track width direction.

It should be noted that, since the recording head HW also is attached to the actuator in the magnetic tape recording and reproducing apparatus according to the embodiment of the present invention, the recording head HW also is shown in FIGS. 13A, 13B and 13C.

Also, the above-mentioned actuator is formed of the piezoelectric element as mentioned above. Since this piezoelectric element has the displacement characteristic of approximately 1 μm/10V shown in FIG. 8, for example, it becomes possible to enable this actuator to correspond to "off-track amount" of the track profile shown in FIG. 12A. Also, it is to be understood that a track profile (FIG. 14) corresponding to an applied voltage (hereinafter referred to as a "reproducing actuator voltage") introduced into the actuator of the reproducing head is equivalent to that shown in FIG. 12A.

Figure 14:
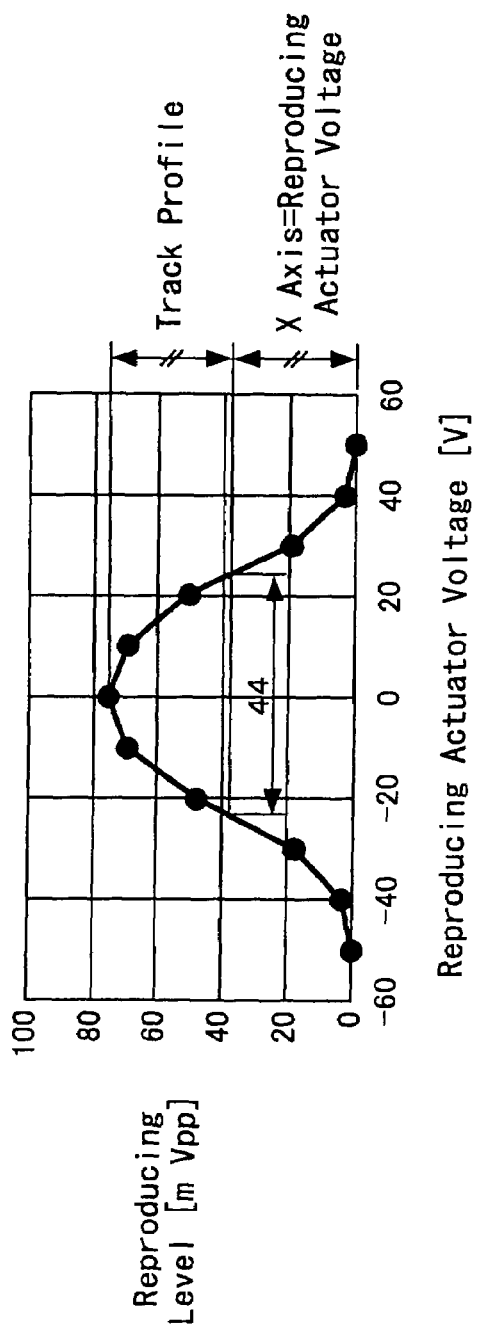
FIG. 14 is a diagram showing a track profile obtained when the output characteristic shown in FIG. 12A is expressed as a reproducing signal level relative to a reproducing head actuator voltage.

In this case, when a half width is calculated again from the track profile shown in FIG. 14, half width≈44V can be obtained and this potential difference becomes a characteristic value obtained in response to the track width of the corresponding track.

Figure 15:
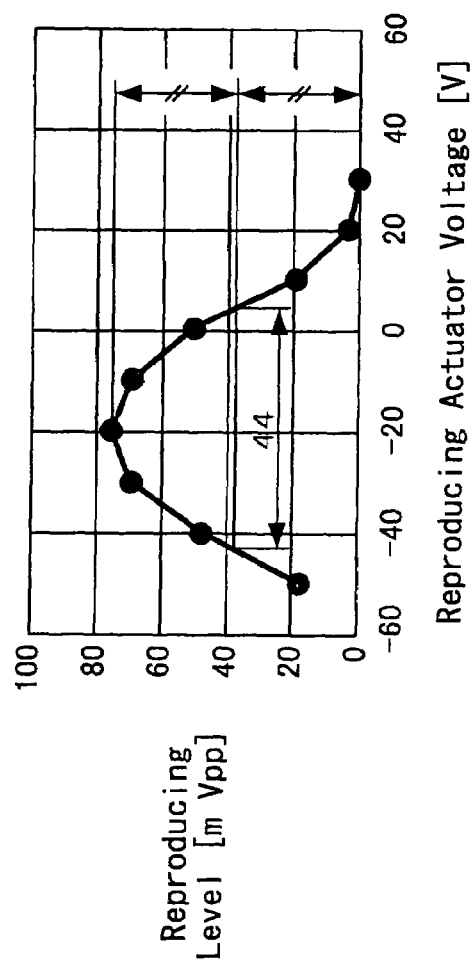
FIG. 15 is a diagram showing a track profile obtained when the output characteristic of the example shown in FIG. 14 is placed in the voltage offset state.

While the track profiles shown in FIGS. 12A, 12B, 12C and FIG. 14 have mountain-like distributions of which tops are obtained when the heads are in the on-track (off-track amount=0) state and the actuator voltage is 0V as described above, the present invention is not limited thereto and a track profile may have a distribution of which top can be obtained when the head are in the off-track state as shown in FIG. 15. Also in this case, the half width can be used as the track width.

Also, the track profile can provide mountain-like characteristic curves of substantially similar shape and size so long as the tape 10 is the same tape and the magnetic tape recording and reproducing apparatus 1 is the same magnetic tape recording and reproducing apparatus. Differences among the shapes of the characteristic curves shown in FIGS. 12A, 12B and 12C are brought about due to an individual difference of magnetic tape recording and reproducing apparatus and a difference of tape sensitivity (quality of material).

The fact that the characteristic value corresponding to the track width can be obtained as the potential difference from the track profile obtained by reproducing the reference tape 10 previously recorded by the equal track width in the helical scan system magnetic tape recording and reproducing apparatus 1 has been described so far.

However, although the above-mentioned method using the exclusively-designed reference tape 10 can be applied to the final adjustment stage in the production line and the like, this method needs a delicate work and it may not be done simply by users according to the necessity. For this reason, it is essential that a next-generation magnetic tape recording and reproducing system having narrower track widths should become able to easily detect track widths without using the reference tape 10a.

A method of adjusting the recording head of the magnetic tape recording and reproducing apparatus 1 without using the reference tape 10a according to this embodiment of the present invention will hereinafter be described with reference to FIGS. 1, 2, 3, 7, 14, 16, 17, 18, 19, 20, 21, 22A, 22B, 23A, 23B, 24, 25A, 25B, 26 and 27.

In the magnetic tape recording and reproducing system 1 according to the embodiment of the present invention, without using the track width measuring reference tape 10a, the magnetic tape recording and reproducing system is able to measure track widths and to locate the recording head at the proper position through adjustment.

It should be noted that the track profile will be described as the characteristic curve obtained relative to the reproducing actuator voltage as shown in FIG. 14.

First, a procedure to record tracks equivalent to those of the reference tape 10a and in which a track width that can be considered to be a proper track width is obtained by using this recorded track in the first process will be described with reference to a flowchart [flowchart A] shown in FIG. 16.

Then, in the [flowchart A], the procedure is divided into a track forming procedure (step a1) and a track width calculating procedure (step a3). A procedure to rewind the tape to the tape top to calculate a track width of a formed track after a desired track was formed by one recording head will be repeated the number n of the recording heads.

It should be noted that the [flowchart A] is not limited thereto and that the track forming procedure (step a1) and the track width calculating procedure (step a3) may be carried out substantially at the same time by executing "read after write" (simultaneous recording and reproduction) during a desired track is being formed by one head.

More specifically, the step a2 may not be executed after the step a1 was ended but it is possible that the step a2 may be executed during the step a1 is being executed. The processing in which a plurality of processing (process) may be executed at the same time can be ordinarily executed by freely using interrupts according to built-in software technologies.

Next, a procedure to calculate a track width from a track recorded under the standard recording and reproducing operation conditions in the second process will be described with reference to a flowchart [flowchart B] shown in FIG. 17.

Figure 18:
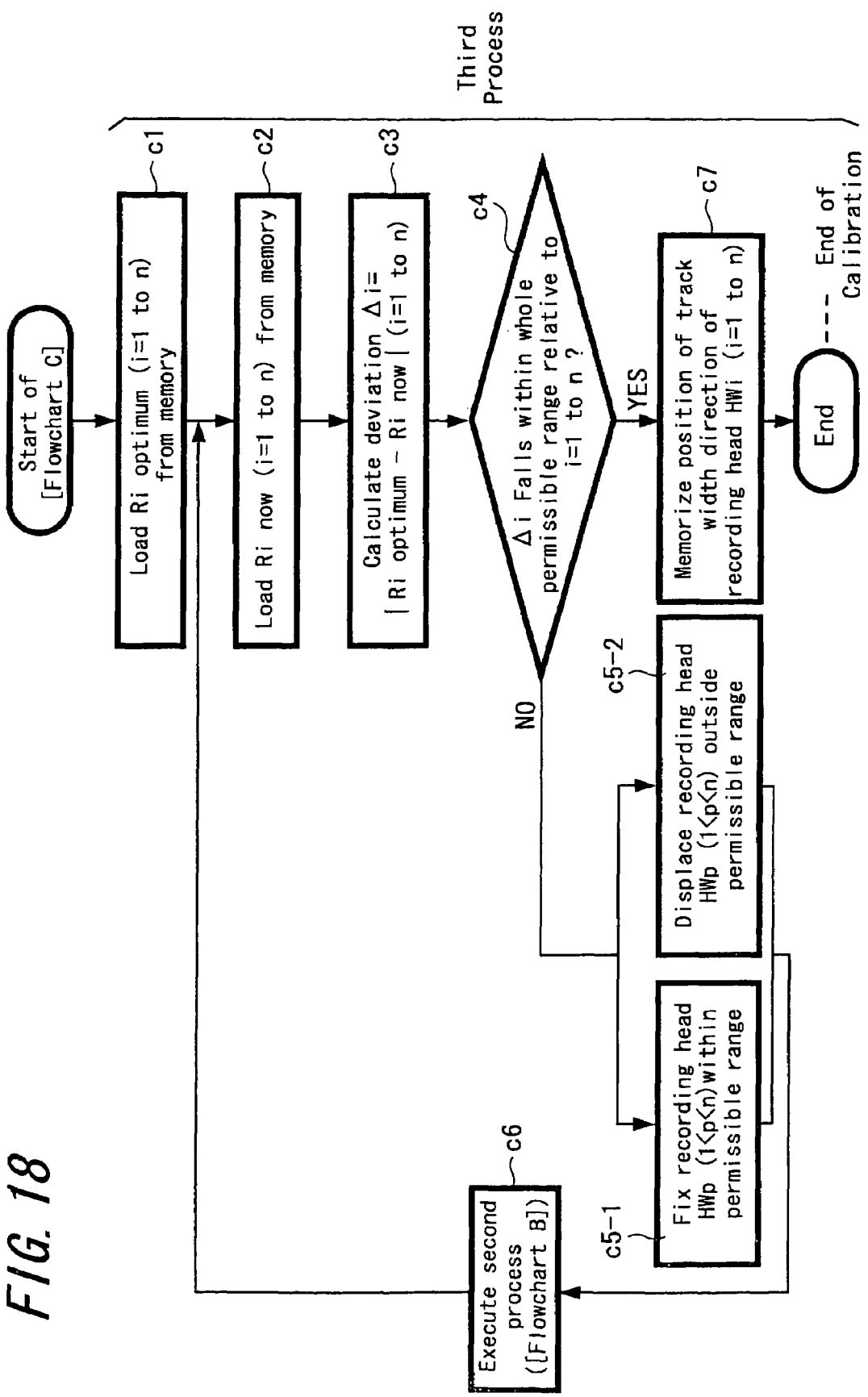
FIG. 18 is a flowchart showing a [flowchart C] which is used to explain a third process in which a recording head is located at the proper position through calibration (adjustment) in a method of adjusting a recording head of a magnetic tape recording and reproducing apparatus according to the embodiment of the present invention.
Figure 19:
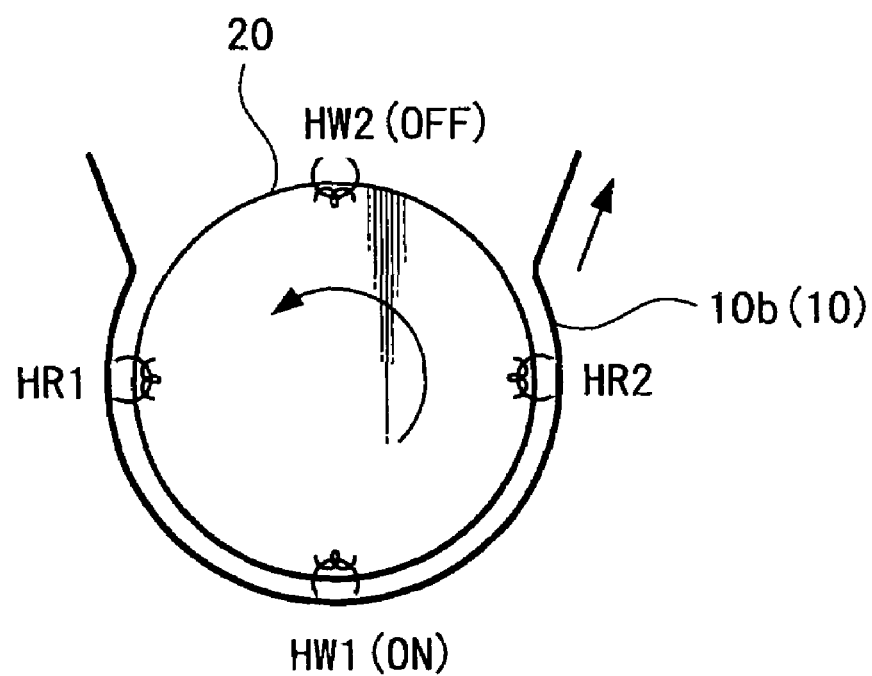
FIG. 19 is an outlined explanatory diagram showing an example of an attachment in which recording heads and reproducing heads are provided on the rotary drum in a method of adjusting a recording head of a magnetic tape recording and reproducing apparatus according to the present invention.

Finally, a procedure to align heights of recording heads from two kinds of track widths obtained from the tracks formed by the same head obtained in the first and second processes in the third process will be described with reference to a flowchart [flowchart C] shown in FIG. 18.

First, an outline of the track forming procedure, which serves as the first half processing of the first process, will be described with reference to the steps a1 and a2 of the [flowchart A] shown in FIG. 16 and processes will be described with reference to FIGS. 16, 19, 20 and 21, FIGS. 1 and 2 and FIG. 14.

Figure 16:
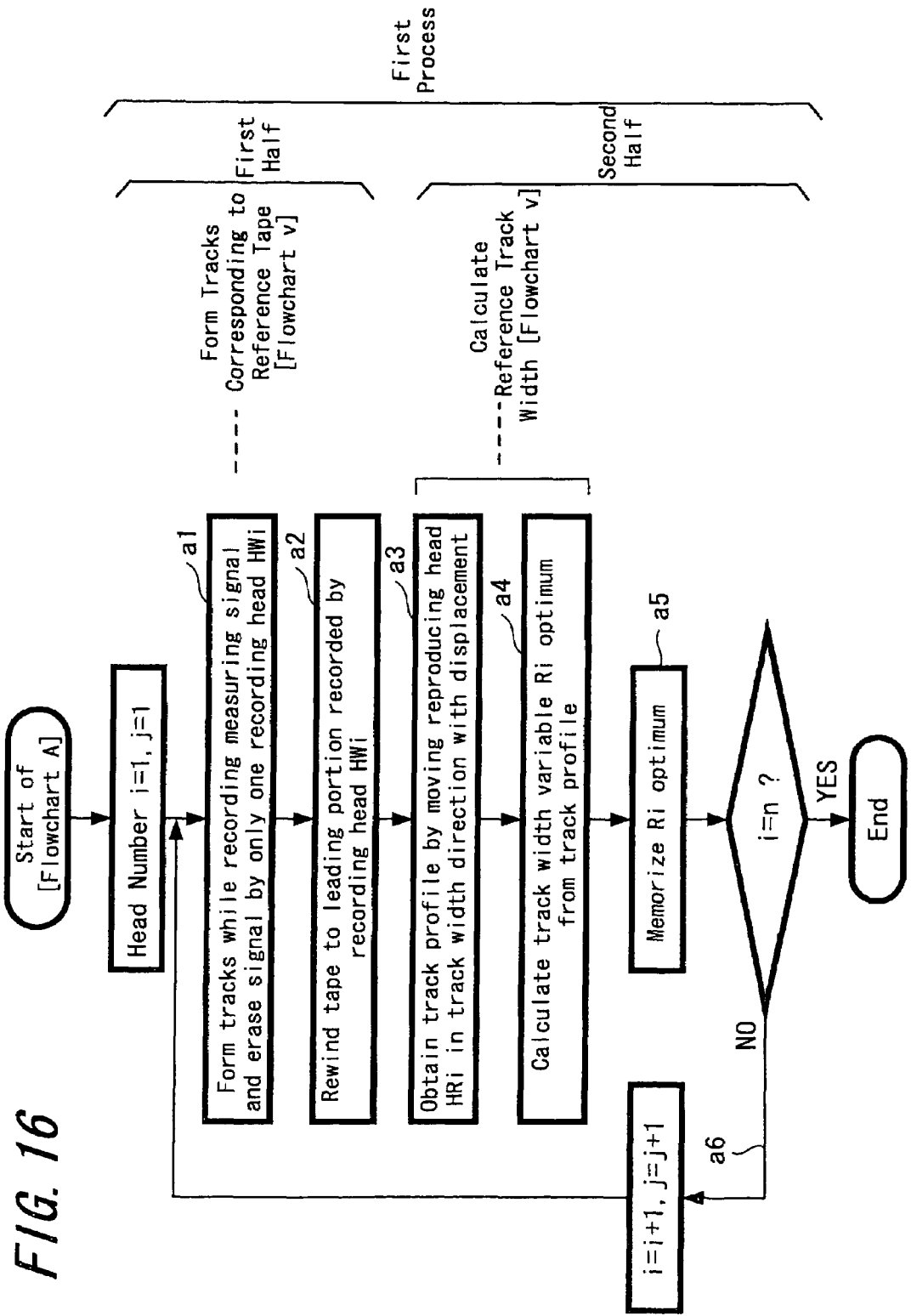
FIG. 16 is a flowchart showing a [flowchart A] which is used to explain a first process in which a track equivalent to that of a reference tape is formed and its track width is calculated in a method of adjusting a recording head of a magnetic tape recording and reproducing apparatus according to the embodiment of the present invention.

In the adjusting method according to the embodiment of the present invention, first, a blank magnetic tape or a magnetic tape in which erasable data is recorded is used and a track measurement measuring signal and an erasure signal are recorded by using only one recording head HWi of n recording heads HWi (i=1 to n) as shown at the step a1 in the [flowchart A] shown in FIG. 16. Then, as shown at the step a2 in the [flowchart A], the tape 10 is rewound up to the leading portion of the data recorded by the recording head HWi, thereby resulting a tape 10b in which tracks corresponding to those of the reference tape 10a are recorded on the tape 10 being obtained.

More specifically, of the two recording heads HW1 and HW2 provided on the rotary drum 20 according to the embodiment of the present invention, only the recording head HW1 is set to the state to record a signal (see FIG. 19) and the tape 10b in which the measurement signal and the erasure signal are alternately recorded by the recording head HW1 in response to the rotation of the rotary drum 20 may be obtained.

Figure 20A:
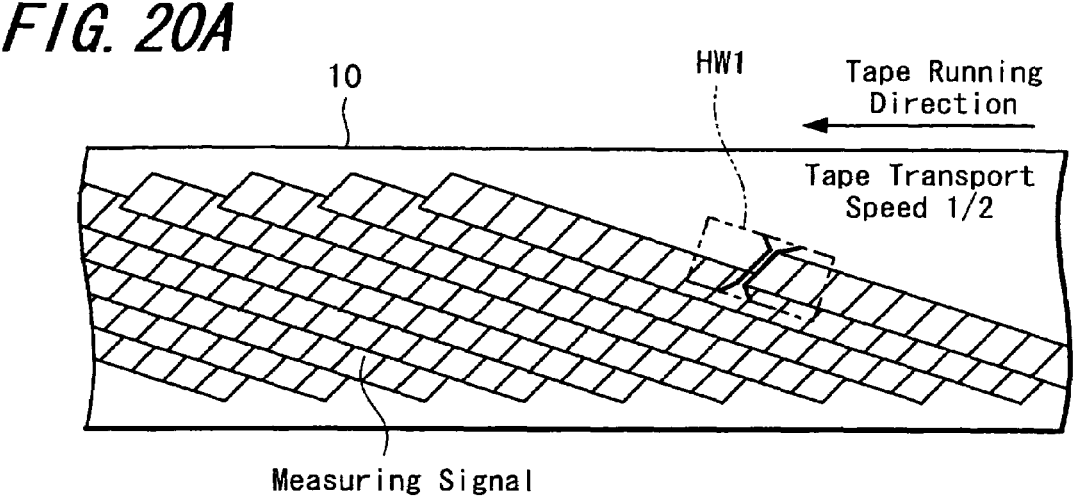
Figure 20B:
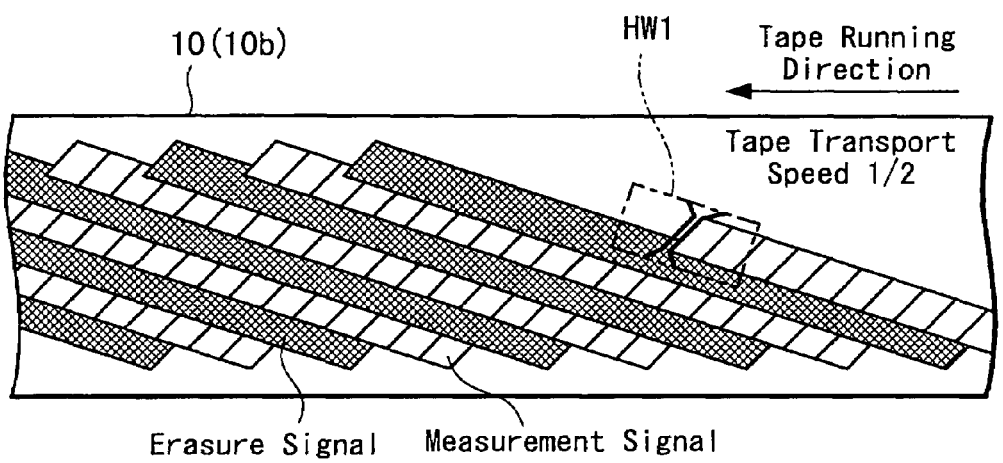
Figure 20C:
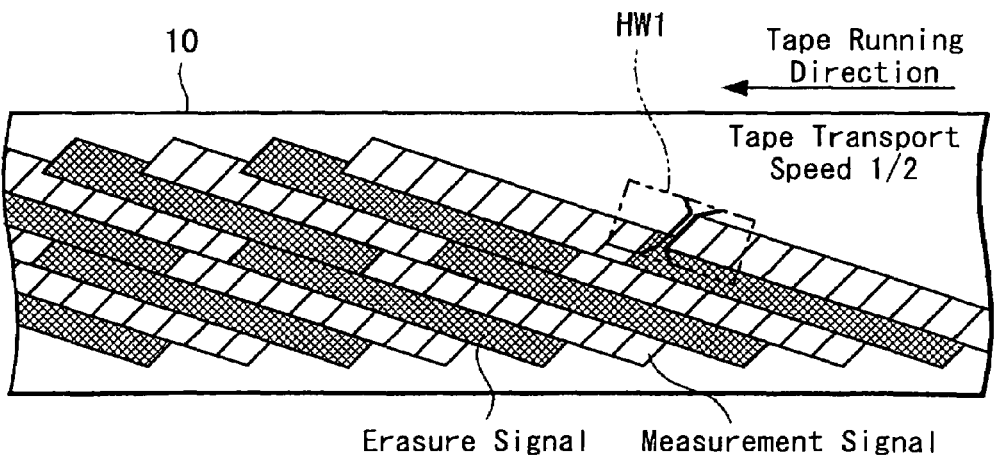
Figure 21:
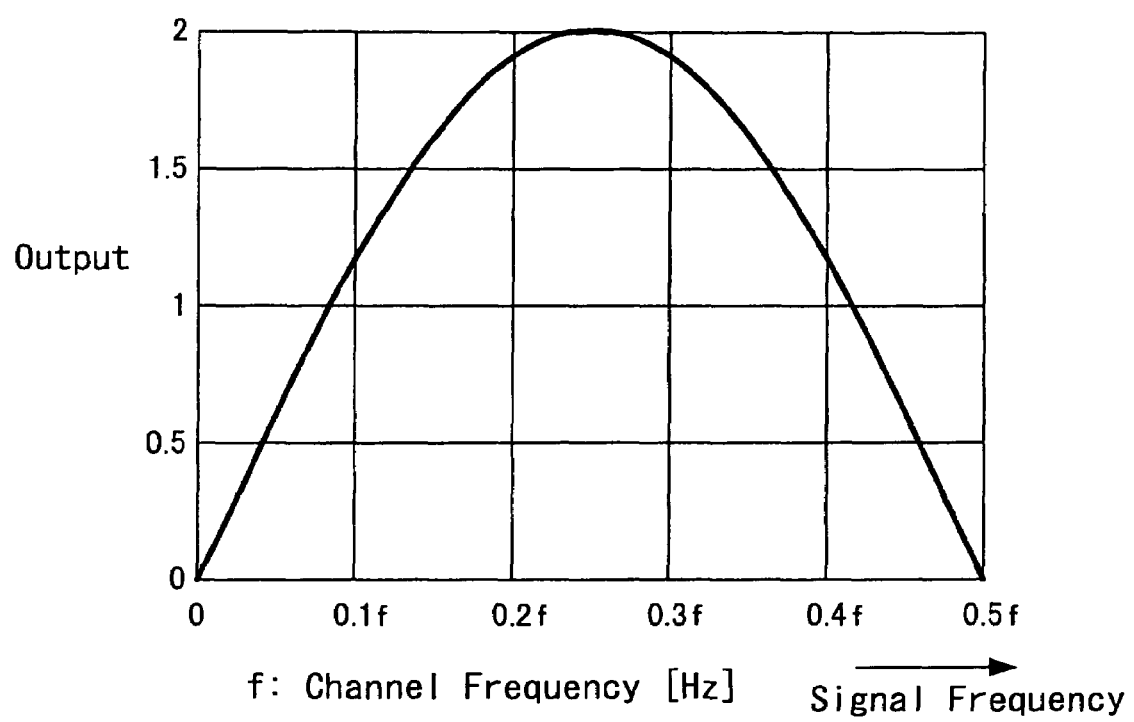
FIG. 21 is a characteristic diagram showing transmission characteristics at partial response class 4 and which shows an example of an output relative to frequency 0 to 0.5×f as a channel frequency f[Hz]

At that time, as shown in FIG. 20A-20C, the rotating speed of the capstan motor 51 (FIG. 1) is controlled by tracking servo such that a tape transport speed may become ½ of the normal speed.

Herein, the reason that the tape transport speed is selected to be ½ of the normal speed when the track in which the signal is recorded by only the recording head HW1 is formed will be described.

In the standard recording operation mode, as shown in FIG. 2, the tape 10 is transported at the normal speed relative to rotations of the two recording heads HW1 and HW2 provided symmetrically with respect to the rotary axis of the rotary drum 20, whereby the tape 10 is helically scanned by the heads HW1 and HW2. At that time, as shown in FIG. 3, a set of tracks Tr1 and Tr2 are recorded on the tape 10 in accordance with one rotation of the rotary drum 20.

For this reason, in order to record continuous measurement signals on the areas equivalent to those of the normal tape transport speed at equivalent recording density by using only the recording head HW1 in the magnetic tape recording and reproducing apparatus 1 according to the embodiment of the present invention, as shown in FIGS. 20A, 20B and 20C, it is necessary that the tape transport speed should be selected to be ½ of the normal mode.

However, in this case, since the magnetic pattern of the track formed on the tape is such one that the tape area is helically scanned by one recording head HW1, as shown in FIG. 20A, although the tracks are formed at equivalent recording density with completely equal track width (track pitch), all azimuth angles become identical.

More specifically, in the normal operation mode (FIG. 2) in the helical scan system magnetic tape recording and reproducing apparatus, a magnetic surface magnetic pattern is formed on the tracks in such a manner that azimuth angles of the adjacent tracks may become opposite to each other so as to suppress crosstalk from the adjacent tracks by azimuth loss upon reproduction as shown in FIG. 3. Consequently, it is possible to reproduce one track without being affected by influences of the magnetic pattern of the adjacent tracks so much.

However, in the recording pattern shown in FIG. 20A, the tracks with only the same azimuth angle are recorded on the magnetic tape and hence azimuth loss does not work effectively. Accordingly, the crosstalk between the adjacent tracks is increased and hence the measurement signal recorded on one track may not be separated and reproduced correctly.

For this reason, according to the embodiment of the present invention, when the measurement signal is recorded on the tape 10 by only the recording head HW1, the tape transport speed may be selected to be ½ of the normal speed and the erasure signal is recorded on the tape 10 at a predetermined timing so that it may become easy to measure the measurement signal recorded on the track.

More specifically, as shown in FIG. 20B, for example, the track is formed while the measurement signal and the erasure signal are being recorded on every track by the recording head HW1.

It should be noted that the magnetic surface magnetic pattern recorded on the track is not limited to the magnetic surface magnetic pattern (see FIG. 20B) in which the measurement signal and the erasure signal are alternately recorded on every track but it can be applied to other surface magnetic pattern in which the measurement signal and the erasure signal are recorded on one track and in which an erasure signal recording area of the adjacent track can be located in the state in which it may substantially correspond to the measurement signal recording area of one track.

An example of an erasure signal used herein will be described.

In order to improve utilization factor of bands, there is a tendency that recent digital magnetic recording apparatus is designed such that digital signal characteristics from recording to reproduction may have a partial response characteristic.

Then, in the characteristics of the transmission system called the partial response class 4 system, the digital magnetic recording apparatus is designed in such a manner that its output is 0 (zero) when a channel frequency f [Hz] is 0 f and 0.5 f and that its output is maximized when the channel frequency f [Hz] is 0.5 f as shown in FIG. 3.

On the other hand, in the digital magnetic recording apparatus, since each bit of digital data is carried in response to one period of the channel frequency, it is customary that a maximum recording frequency that can be considered becomes a frequency which is half of the channel frequency. That is, maximum recording frequency=channel frequency/2 (=0.5 f) is satisfied and this frequency is what might be called a Nyquist frequency.

Then, in the apparatus having the transmission characteristics called the partial response class 4, since the output of 0.5 f (=Nyquist frequency) becomes 0 (zero), the Nyquist frequency can be used as an erasure signal for the channel frequency.

It should be noted that the measurement signal are not always recorded while the erasure signal is being supplied to every other track as described above. Alternatively, as shown in FIG. 20C, two tracks in which the first half of one track is formed of the erasure signal and the second half of one track is formed of the measurement signal, the first half of the adjacent track is formed of the measurement signal and in which the second half of the adjacent track is formed of the erasure signal may be repeated.

More specifically, although all tracks of the same azimuth angle are recorded by one recording head HW1 as shown in FIGS. 20A, 20B and 20C, since the erasure signal formed of the Nyquist frequency of which transmission output becomes 0 (zero) is recorded on the track adjoining the area in which the track measurement signal is recorded, the reproducing head HR1 can reproduce the measurement signal without crosstalk to thereby obtain the track profile.

Here, when the channel frequency, for example, is 100 MHz, a signal frequency of 50 MHz can be used as the erasure signal and a signal frequency of 10 MHz which is outside the band of the erasure signal can be used as the track width measurement signal.

The track forming process at the step a1 of the first half of the first process in the [flowchart A] shown in FIG. 16 will be described below with reference to flowcharts [flowchart u1] and [flowchart u2] shown in FIGS. 22A and 22B.

Figure 22A:
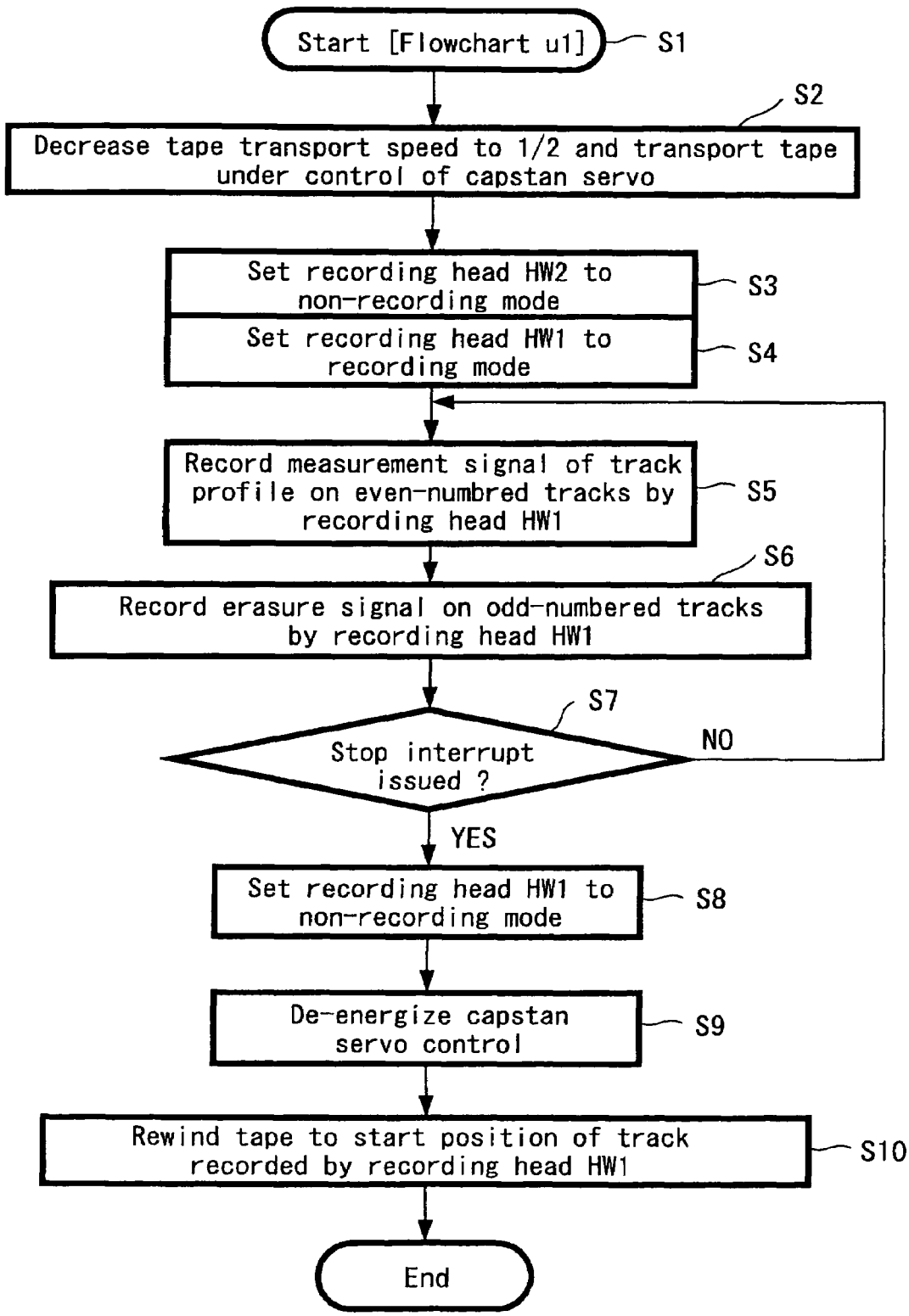
Figure 22B:
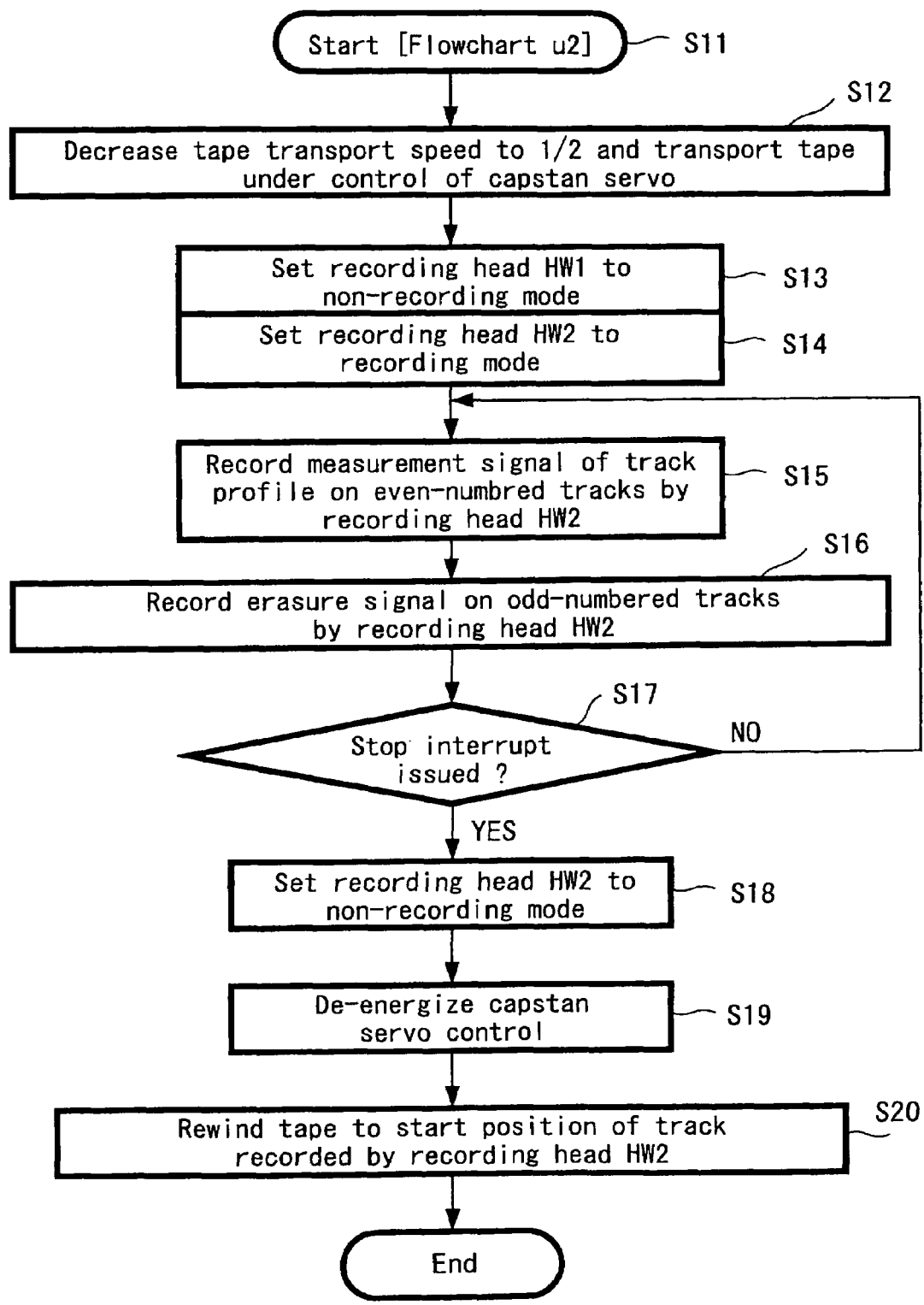

The [flowchart u1] shown in FIG. 22A shows an example in which tracks are to be formed by only the recording head HW1, and the [flowchart u2] shown in FIG. 22B shows an example in which tracks are to be formed by only the recording head HW2.

In the state in which the magnetic tape 10 that can be made recordable is set to the magnetic tape recording and reproducing apparatus 1, first, as shown in FIG. 22A, control is started at a step S1 based on a start command from the CPU 110 (FIG. 7). Subsequently, control goes to a step S2, whereat the tape transport speed is selected to be ½ of the normal speed and the magnetic tape 10 is transported under capstan servo control. Then, control goes to a step S3, whereat the recording head HW2 is placed in the non-recording (non-writing) state. Next, control goes to a step S4, whereat the recording head HW1 is placed in the recording (writing) state.

It should be noted that the CPU 110 in the magnetic tape recording and reproducing apparatus 1 is able to voluntarily issue a start command as the calibration operation start command at the step S1. Then, the CPU 110 is able to issue the start command each time power switch is turned on, change of temperature is detected or an error rate is deteriorated.

Next, control goes to a step S5, whereat the measurement signal to obtain the track profile (FIG. 14) is recorded on the even-numbered track by the recording head HW1 in accordance with one rotation of the rotary drum 20. Then, control goes to a step S6, whereat the erasure signal (Nyquist frequency) is recorded on the odd-numbered track by the recording head HW1 in accordance with the next one rotation of the rotary drum 20. Control goes to the next decision step S7, whereat it is determined whether or not a stop command (stop interrupt) is issued from the host computer 101 (FIG. 7). If the stop command is not issued from the host computer 101 as represented by a NO at the decision step S7, then control goes back to the step S5. The steps S5 to S7 are repeated until it is determined that the stop command is issued from the host computer 101. If the stop command is issued from the host computer 101 as represented by a YES at the decision step S7, then control goes to the next step S8.

Next, if it is determined that the stop interrupt is issued from the host computer 101, then the recording head HW1 is placed in the non-recording (non-writing) state at the step S8. Then, at a step S9, capstan servo control is de-energized and the tape transport is stopped.

Finally, control goes to the next step S10, whereat the magnetic tape 10 is rewound up to the starting position of the track recorded by the recording head HW1.

As a result, there can be obtained the magnetic tape 10 in which the track on which the magnetic pattern is recorded and the track on which the erasure signal is recorded are alternately recorded by only the recording head HW1 as shown in FIG. 20B and by which the track profile equivalent to that of the reference tape 10a can be measured correctly.

FIG. 22B shows a procedure in which tracks equivalent to the above-mentioned reference tape 10 are formed by only the recording head HW2 as the [flowchart u2]. In the [flowchart u2] shown in FIG. 22B, only the recording head HW1 is replaced with the recording head HW2 in the steps S11 to S20. Therefore, the steps S11 to S20 are exactly the same as the steps S1 to S10 in the [flowchart u1] shown in FIG. 22A and therefore need not be described.

Next, an outline of a procedure, serving as the second half processing of the first process, in which a track profile is obtained from the tracks formed on the tape 10 to thereby calculate the reference track width will be described with reference to the steps a3 to a6 of the [flowchart A] shown in FIG. 17. The processing process will be described with reference to FIGS. 7, 16, 22A, 22B, 23A and 23B.

An outline of processing will be described. First, as shown at the step a3 in the [flowchart A] shown in FIG. 16, a track profile is obtained from the tracks of the tape 10b equivalent to the track width measuring reference tape 10 and in which a measurement signal is recorded. At that time, while the voltage applied to the actuator is changed and the reproducing head HRj fixed to this actuator is being displaced in the track width direction, the amplitude (reproducing level) of the reproduced waveform signal is measured and a track profile of reproducing level corresponding to a reproduced actuator voltage is obtained.

After that, as shown at a step a4 in the [flowchart A] shown in FIG. 16, a track width, which can be used as a standard of measurement, is calculated from this track profile, and this track width is obtained as a variable Ri optimum. At that time, "track width" is expediently defined by a half width of a track profile (characteristic curve) which distributes in a mountain-like shape.

Then, as shown at a step a5 in the [flowchart A] shown in FIG. 16, the track width variable Ri optimum is stored in the RAM (random-access memory) 160 (FIG. 7).

Then, as shown at a step a6 in the [flowchart A] shown in FIG. 16, the steps a1 to a5 are effected on each of the recording heads HWi of the number provided on the rotary drum 20, whereby track width variables Ri optimum (i=1 to n) are calculated relative to n track profiles and stored in the RAM 160 (FIG. 7).

In this manner, by using the track width variable Ri optimum (i=1 to n) as the scale, although it is indirect, it is possible to quantitatively determine whether the track width recorded on the tape is wide or narrow.

More specifically, the track width variable Ri optimum (i=1 to n) can be obtained by reproducing the track in which the measurement signal is recorded by the recording head HWi so as to be surrounded by the erasure signals with the reproducing head HRj in the state in which influences of other adjacent tracks are removed.

Then, the value itself of the track width variable Ri optimum (i=1 to n) is obtained by a combination of the i-th recording head HWi and the reproducing head HRj which corresponds to the i-th recording head HWi in a one-to-one correspondence fashion. Because individual heads have different characteristics, n different values are stored in the RAM 160 (FIG. 7) in response to a combination of n sets of heads.

Herein, a relationship between the i-th recording head HW1 and the reproducing head HRj which corresponds to the i-th recording head HWi in a one-to-one correspondence fashion will be arranged.

Since the magnetic tape recording and reproducing apparatus according to the embodiment of the present invention has a multi-head arrangement including n recording heads and m reproducing heads, when the magnetic tape is rewound and reproduced after magnetic information was recorded on the tracks of the magnetic tape, there is a risk that a track recorded by the first recording head will not be reproduced by the first reproducing head so that the recording head HWi and the reproducing head HRj will become unable to correspond to each other. However, as described above, in the magnetic recording and reproducing apparatus according to the embodiment of the present invention, the magnetic recording and reproducing apparatus may be designed in advance such that any one of the m reproducing heads can correspond to each of the n recording heads in a one-to-one correspondence fashion.

More specifically, if the reproducing heads used when Rx optimum and Rx now are to be measured are not the same, then they may not be compared with each other. Therefore, restrictions are imposed on reproducing capstan servo of the magnetic recording and reproducing apparatus such that, in any of the reproduction in Rx optimum and Rx now, a track recorded by one recording head HW should be reproduced by one corresponding reproducing head HR. That is, reproducing capstan servo is applied to the magnetic recording and reproducing apparatus in such a manner that, with respect to the recording head HW1, for example, and any of the reproducing heads HR1, HR2, HR3, HR4, . . . , a corresponding one reproducing head HR may not fail to reproduce the track recorded by the recording head HW1 even when the magnetic tape is reproduced repeatedly.

Figure 17:
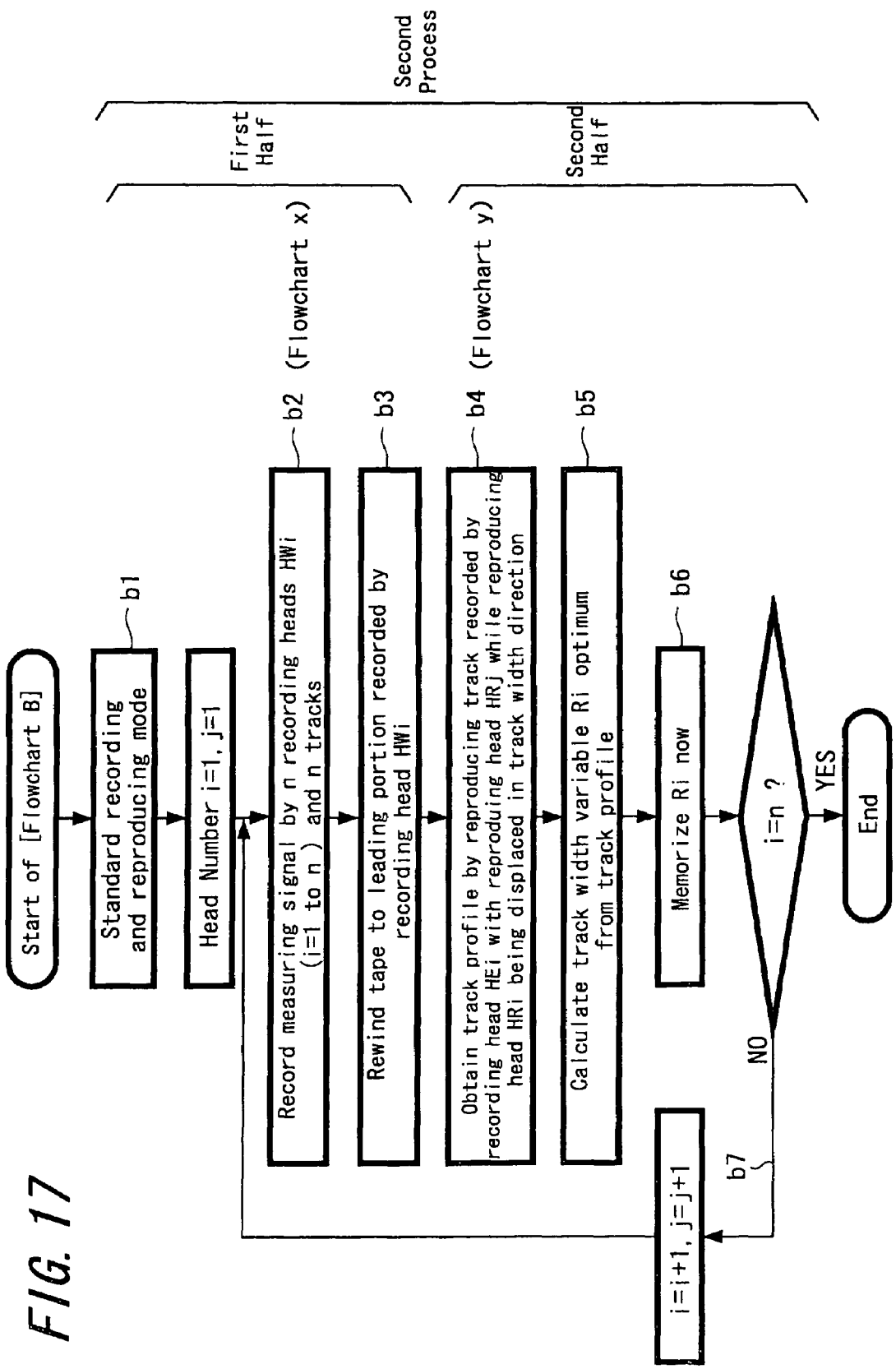
FIG. 17 is a flowchart showing a [flowchart B] which is used to explain a second process in which a track width of a track recorded on the tape in the standard operation mode is calculated in a method of adjusting a recording head of a magnetic tape recording and reproducing apparatus according to the embodiment of the present invention.

In the flowcharts of FIGS. 16 and 17, in the initialization of the head, i is set to 1 (i=1) and j is set to 1 (j=1) in order to enable the recording head HW1 and the reproducing head HR1 to correspond to each other.

Having described the above head initialization additionally, it is to be understood that, when the magnetic tape recording and reproducing apparatus includes n recording heads HW and m reproducing heads HR, a relationship of m/n=integer is generally established. Hence, n=4 and m=8, for example, are satisfied. Then, on the rotary drum 20, two reproducing heads HR are disposed between the two recording heads HW. More specifically, assuming now that these heads are recording heads HW1 to HW4, reproducing heads HR1-1, HR1-2, HR2-1, HR2-2, . . . HR4-1 and HR4-2, then recording and reproducing heads HW1, HR1-1, HR1-2, HW2, HR2-1, HR2-2, HW3, HR3-1, HR3-2, HW4, HR4-1 and HR4-2 are disposed around the rotary drum 20.

Then, if the magnetic tape recording and reproducing apparatus is set to the read after write (simultaneous recording and reproduction), then since a track recorded by the first recording head HW1 is reproduced by the first reproducing head HR1-1, a track recorded by the recording head HW2 is reproduced by the reproducing head HR2-1, a track recorded by the recording head HW3 is reproduced by the reproducing head HR3-1 and a track recorded by the recording head HW4 is reproduced by the reproducing head HR4-1, a relationship between the recording heads HW and the reproducing heads HR is simple. Hence, the recording heads HR and the reproducing heads HR need not be designed in advance such that the recording heads HW and the reproducing heads HR may correspond to each other in a one-to-one correspondence fashion such as when the magnetic tape is rewound and reproduced after magnetic information was recorded on the tracks of the magnetic tape.

Next, the track width calculation process of the second half of the first process will be described with reference to flowcharts [flowchart v1] and [flowchart v2] shown in FIGS. 22A, 22B and FIGS. 23A, 23B and FIG. 7.

The flowchart [flowchart v1] shown in FIG. 22A shows an example in which the magnetic tape is reproduced by the reproducing head HR1 while the reproducing head HR1 is being displaced in the track width direction relative to the track formed by the recording head HW1. The flowchart [flowchart v2] shown in FIG. 22B shows an example in which the magnetic tape is reproduced by the reproducing head HR2 while the reproducing head HR2 is being displaced in the track width direction relative to the track formed by the recording head HW2.

Figure 23A:
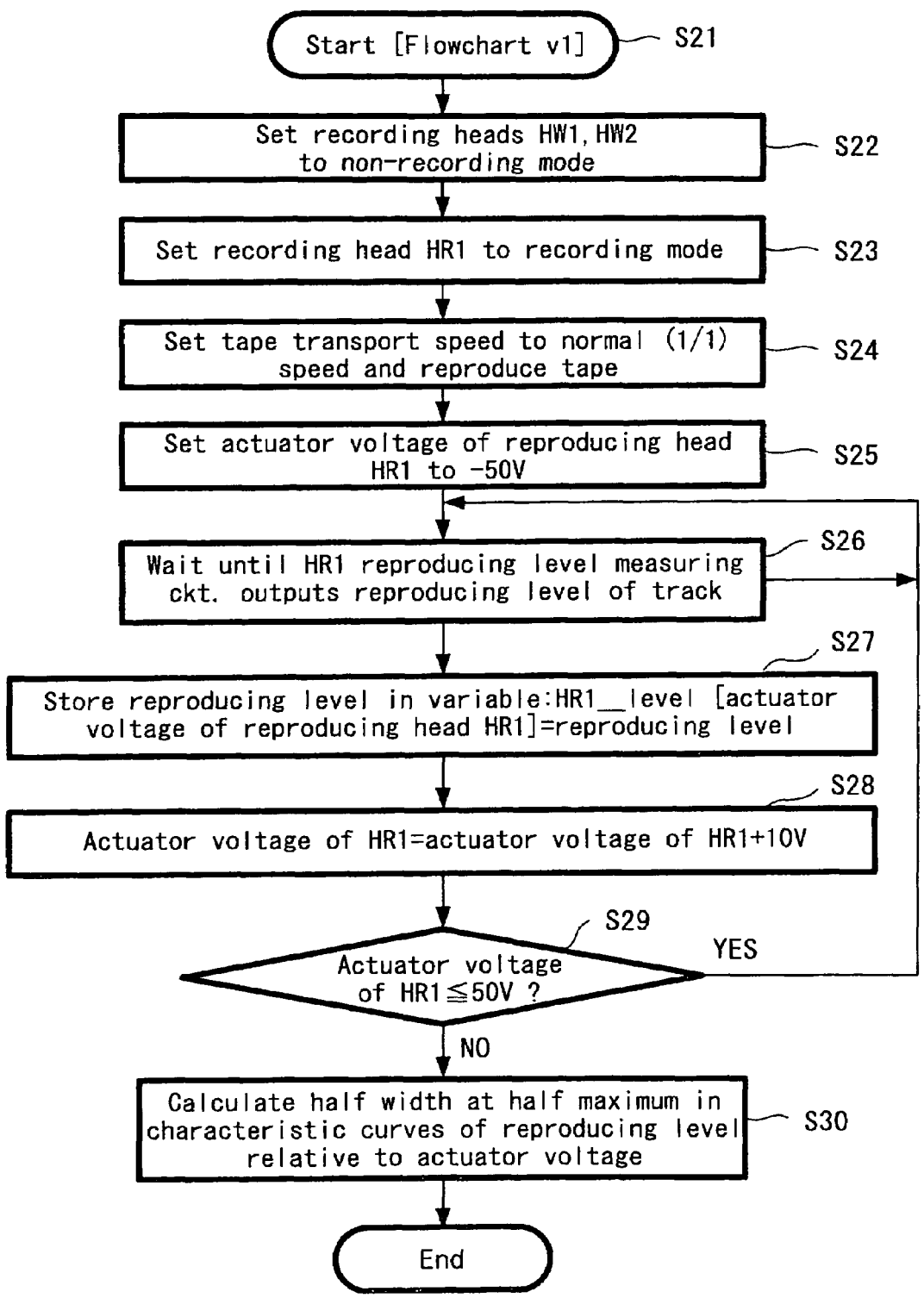

In the state in which the magnetic tape 10 is rewound up to the starting position of the recorded portion at the step S10 of the [flowchart u1] shown in FIG. 22A, the [flowchart v1] is started by the CPU 110 (FIG. 7) at a step S21 shown in FIG. 23A.

Next, control goes to a step S22, whereat the recording heads HW1, HW2 are set to the non-recording (non-writing) state and the reproducing head HR2 is set to the non-reproducing (non-reading) state. Then, control goes to a step S23, whereat the reproducing head HR1 is set to the reproducing (reading) state.

Next, in this state, control goes to a step S24, whereat the tape transport speed is selected to be a normal speed, and control goes to a step S25, whereat the actuator voltage of the reproducing head HR1 is set to −50V, for example.

Herein, having additionally described the tape transport speed, it is to be understood that, while the tape transport speed should be decreased to ½ of the normal tape transport speed in order to carry out standard track pitch recording because the [flowchart u1] described single head recording, a resultant track becomes such one formed by the standard track pitch. Then, in the [flowchart v1], the tape recorded with the standard track pitch in the [flowchart u1] is reproduced and hence the magnetic tape is transported at the normal tape transport speed under CTL servo.

Next, control goes to a step S26, whereat the magnetic recording and reproducing apparatus is placed in the standby mode until the HR1 reproducing level measuring circuit 107a shown in FIG. 7 outputs a reproduced waveform of the measurement signal of "even-numbered track". That is, the erasure signal of "odd-numbered track" can be neglected.

Next, when the reproduced waveform of the measurement signal of "even-numbered track" is outputted from the HR1 reproducing level measuring circuit 107a, control goes to a step S27, whereat the reproducing level obtained from the amplitude of this reproduced waveform is stored as data corresponding to the actuator voltage of the reproducing head HR1. As the variable stored at that time, a variable HR1_level [actuator voltage of reproducing head HR1] can be introduced and HR1_level [actuator voltage of reproducing head HR1]=reproducing level can be satisfied.

Subsequently, control goes to a step S28, whereat [actuator voltage of reproducing head HR1]=[actuator voltage of reproducing head HR1]+[10V] is satisfied. Then, the position of the reproducing head HR1 is displaced in the track width direction by changing the actuator voltage from −50V to +50V in the unit of 10V, for example.

Then, control goes to the next decision step S29, whereat it is determined whether or not the actuator voltage of the reproducing head HR1 reaches 50V. If the actuator voltage of the reproducing head HR1 is less than 50V as represented by a YES at the decision step S29, then control goes back to the step S26. If on the other hand the actuator voltage of the reproducing head HR1 is greater than 50V as represented by a NO at the decision step S29, then control goes to a step S30.

Then, at the step S30, a half width (see FIG. 14) in the track profile of the "reproducing level" relative to the "actuator voltage" is calculated. This calculated value becomes a variable R1 optimum corresponding to the track width of the track formed on the tape 10b equivalent to the reference tape 10a.

As described above, it is possible to reproduce the even-numbered tack recorded by the recording head HW1 to thereby obtain the track profile to calculate the track width variable Ri optimum by executing the processing of the [flowchart v1] following the processing of the [flowchart u1]. It should be noted that the half width of this case may be calculated as a potential difference to supply a predetermined displacement amount to the actuator.

Figure 23B:
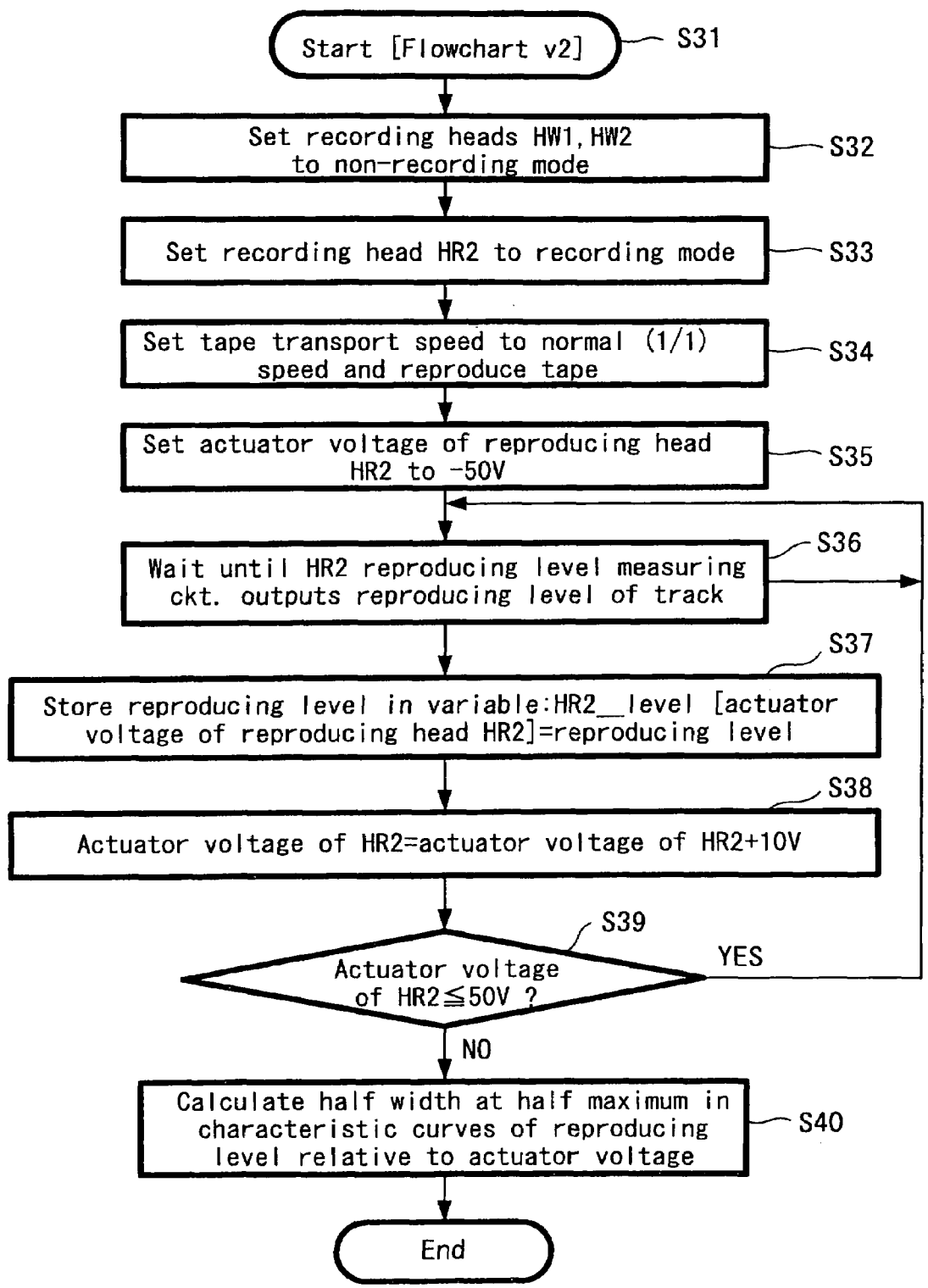

Also, the procedure to obtain a track width by calculating a track profile from the measurement signal recorded on the magnetic tape 10 by the recording head HW2 is shown in the [flowchart v2] of FIG. 23B. In steps S31 to S40, the recording head HWi and the recording head HW2 in the [flowchart v2] are replaced with each other and also the reproducing head HR1 and the reproducing head HR2 are replaced with each other. Contents of the steps S31 to S40 are the same as those of the steps S21 to S30 in the [flowchart v1] shown in FIG. 23A and therefore need not be described.

According to the procedure shown in the [flowchart v2] of FIG. 23B, it is possible to obtain a variable R2 optimum corresponding to a track width obtained when the even-numbered track recorded by the recording head HW2 is reproduced by the reproducing head HR2.

It should be noted that, in the magnetic tape recording and reproducing apparatus according to the embodiment of the present invention, operations to record the measurement signal for measuring a track width on the tape 10b have been described with reference to the [flowchart u1] (FIG. 22A) and the [flowchart u2] (FIG. 22B). In the flowcharts u1 and u2 shown in FIGS. 7A and 7B, the recording operation stop signal (steps S7 and S17) may be issued from the CPU 110 (FIG. 7) at the time magnetic information was recorded on the tracks of necessary and enough number. It is sufficient that this predetermined time in which magnetic information can be recorded on the tracks of necessary and enough number may be approximately 10 seconds at most during which the magnetic tape can be transported. For this reason, a track measurement signal can be recorded on a very small area of the tape top or tape end which generally becomes a blank portion of the tape and variables corresponding to track widths can be calculated by the procedures of the [flowchart v1] and [flowchart v2] shown in FIGS. 23A and 23B.

Next, an outline of the first half processing of the second process shown in FIG. 17 (processing at steps b1 and b2 of the [flowchart B]), that is, the procedure for forming tracks recorded under standard recording and reproducing operation conditions will be described with reference to FIGS. 2, 3, 4, 17 and 24.

The standard recording and reproducing operation is an operation to drive and control the magnetic tape recording and reproducing apparatus in such a manner that both of a tape transport speed and a rotating speed of the rotary drum 20 may become so-called normal speeds and in which a plurality of heads may be simultaneously made effective to record and/or reproduce magnetic information in the data recording and reproduction. In this operation, tracks formed by a plurality of recording heads HWi (i=1 to n) may be reproduced by a plurality of reproducing heads HRj (j=1 to m).

More specifically, the two recording heads HW1 and HW2 attached to the rotary drum 20 according to this embodiment of the present invention are made able to record the measurement signal and they become able to alternately record the measurement signal on the tracks in accordance with rotation of the rotary drum 20.

An outline of processing will be described. First, as shown at the step b1 in the [flowchart B] shown in FIG. 17, the magnetic tape recording and reproducing apparatus 1 is set to the normal recording/reproducing mode. At that time, the tape transport speed is the normal speed.

After that, as shown at the step b2 of the [flowchart B], the tracks on which the measurement signal is recorded are formed on a tape 10c by n recording heads HW1 (i=1 to n and in this embodiment, n=2).

Then, as shown at the step b3 of the [flowchart B], the magnetic tape is rewound up to the starting position of the track recorded by the recording head HWi, whereby the tape 10c in which a set of n tracks are substantially simultaneously formed by one rotation of the rotary drum 20 is manufactured. At that time, each track corresponds to the attachment position in the rotary drum 20 of the recording head HWi (i=1 to n). At that time, each track width is not equal.

The track forming process of the first half of the second process of the [flowchart B] shown in FIG. 17 will be described with reference to a flowchart [flowchart x] shown in FIG. 24.

Figure 24:
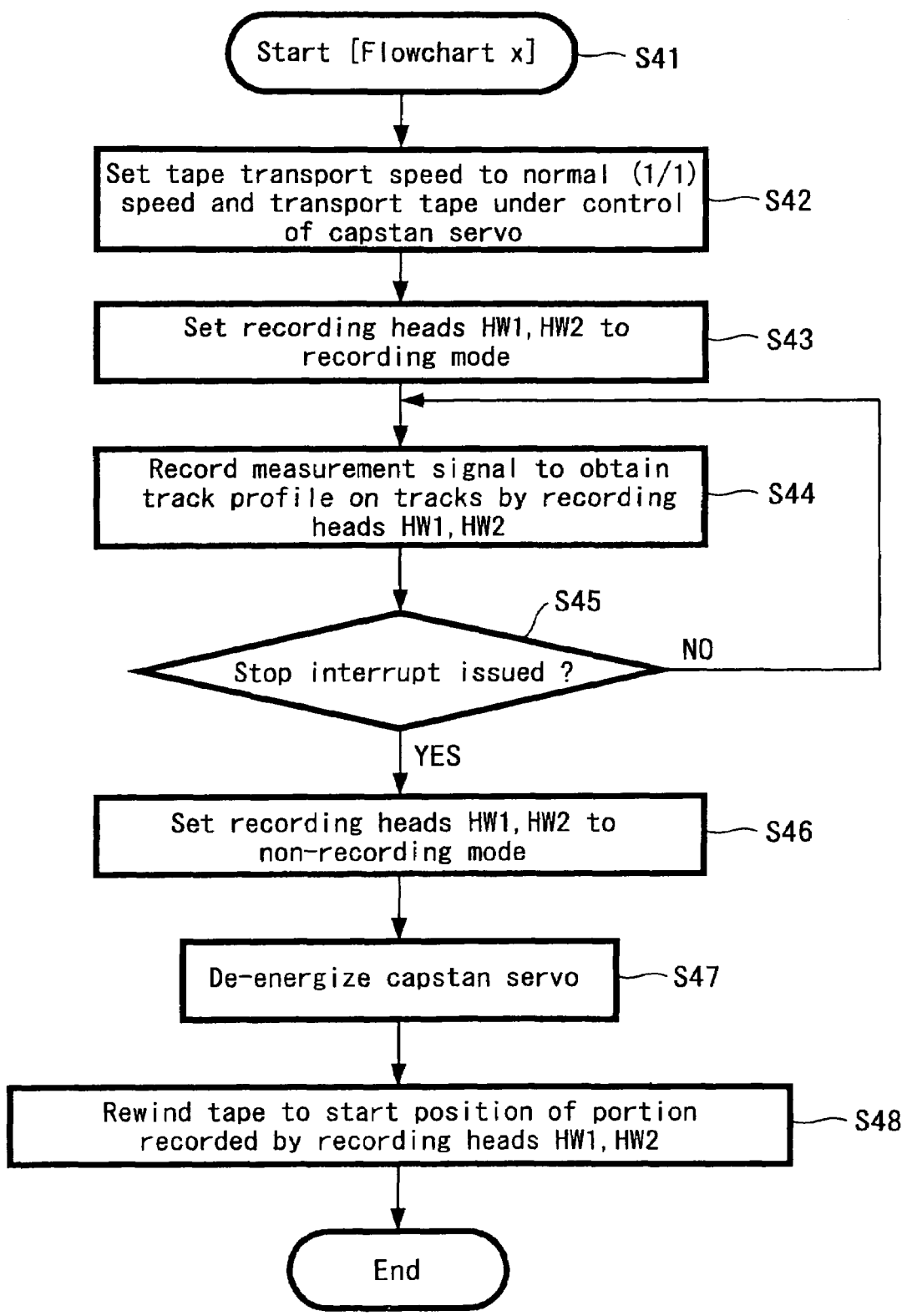
FIG. 24 is a flowchart to which reference will be made in explaining a track forming process in the standard operation mode in the first half of the second process of the example shown in FIG. 17.

The flowchart [flowchart x] shown in FIG. 24 shows a processing in which the tracks are formed by the two recording heads HW1 and HW2.

In the state in which the magnetic tape that can be made recordable is set to the magnetic tape recording and reproducing apparatus, control goes to a step S41, whereat operation of the magnetic tape recording and reproducing apparatus is started by a start command from the CPU 110 (FIG. 7). Next, control goes to a step S42, whereat the tape transport speed is selected to be a normal tape speed (1/1) and the tape is transported under capstan servo control.

Subsequently, control goes to a step S43, whereat the two recording heads HW1 and HW2 are set to the recording (writing) mode. Then, control goes to a step S44, whereat measurement signals to obtain a track profile are recorded by the recording heads HW1 and HW2 in accordance with one rotation of the rotary drum 20.

Next, control goes to the next decision step S45, whereat the stop command is issued from the CPU 110 (FIG. 7). If the stop command is not issued from the CPU 110 as represented by a NO at the decision step S45, then control goes back to the step S44. If the stop command is issued from the CPU 110 as represented by a YES at the decision step S45, then control goes to a step S46.

Subsequently, at the step S46, the recording heads HW1 and HW2 are set to the non-recording (non-writing) mode, and control goes to a step S47, whereat capstan servo control is de-energized and the tape transport operation is stopped.

Finally, control goes to a step S48, whereat the magnetic tape is rewound up to the starting position of the portion recorded by the recording heads HW1 and HW2.

Figure 4:
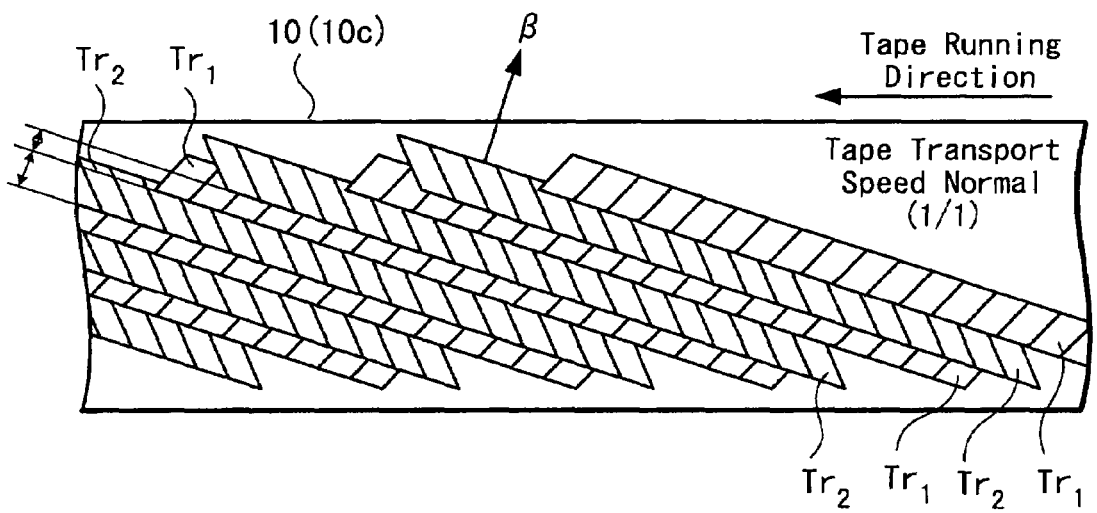
FIG. 4 is a schematic diagram used to explain magnetic patterns of a magnetic surface formed on the magnetic tape by two recording head of the magnetic tape recording and reproducing apparatus shown in the example of FIG. 2 (inappropriate head positions)

Consequently, there can be obtained the tape 10c in which the measurement signals having magnetic patterns with different azimuth angles shown in FIG. 3 or FIG. 4 are alternately recorded by the recording heads HW1 and HW2.

Next, the procedure to obtain a track width from tracks recorded under the normal recording and reproducing operation conditions which is the processing at the steps b4 to b7 of the [flowchart B] of the second half of the second process shown in FIG. 17 will be described with reference to FIGS. 7, 17, 24 and FIGS. 25A, 25B.

An outline of the processing in the second half of the second process will be described. As shown at the step b4 of the [flowchart B] shown in FIG. 17, first, while the j-th reproducing head HRj is being displaced in the track width direction by the actuator, the measurement signal recorded on the track on the tape is reproduced and a track profile corresponding to the recording head HWi is obtained.

After that, as shown at the step b5 of the [flowchart B] shown in FIG. 17, a value obtained from the half width of the track profile is calculated as a variable Ri now corresponding to the track width obtained under the normal conditions. Herein, the track profile is obtained as a reproducing level relative to the reproducing actuator voltage, and the half width is obtained as a potential difference to apply a predetermined displacement amount to the actuator.

After that, as shown at the step b6 of the [flowchart B] shown in FIG. 17, the track width variable Ri now is stored in the RAM 160 (FIG. 7).

Then, as shown at the step b7 of the [flowchart B] shown in FIG. 17, the steps b2 to b6 are executed on each of the recording heads HWi attached to the rotary drum 20 and track width variables Ri now (i=1 to n) relative to n track profiles are calculated and stored in the RAM 160 (FIG. 7).

The thus obtained n variables Ri now (i=1 to n) become different values, respectively. The reason for this is that dispersions of attachment positions of the recording heads HWi (i=1 to n) on the rotary drum 20 in the tape recording and reproducing apparatus reflect on the different values of the n variables Ri now.

The processing of the second half (steps b4 to b7) of the second process which is the [flowchart B] shown in FIG. 17 will hereinafter be described with reference to [flowchart y1] and [flowchart y2] of flowcharts shown in FIGS. 25A and 25B.

Figure 25A:
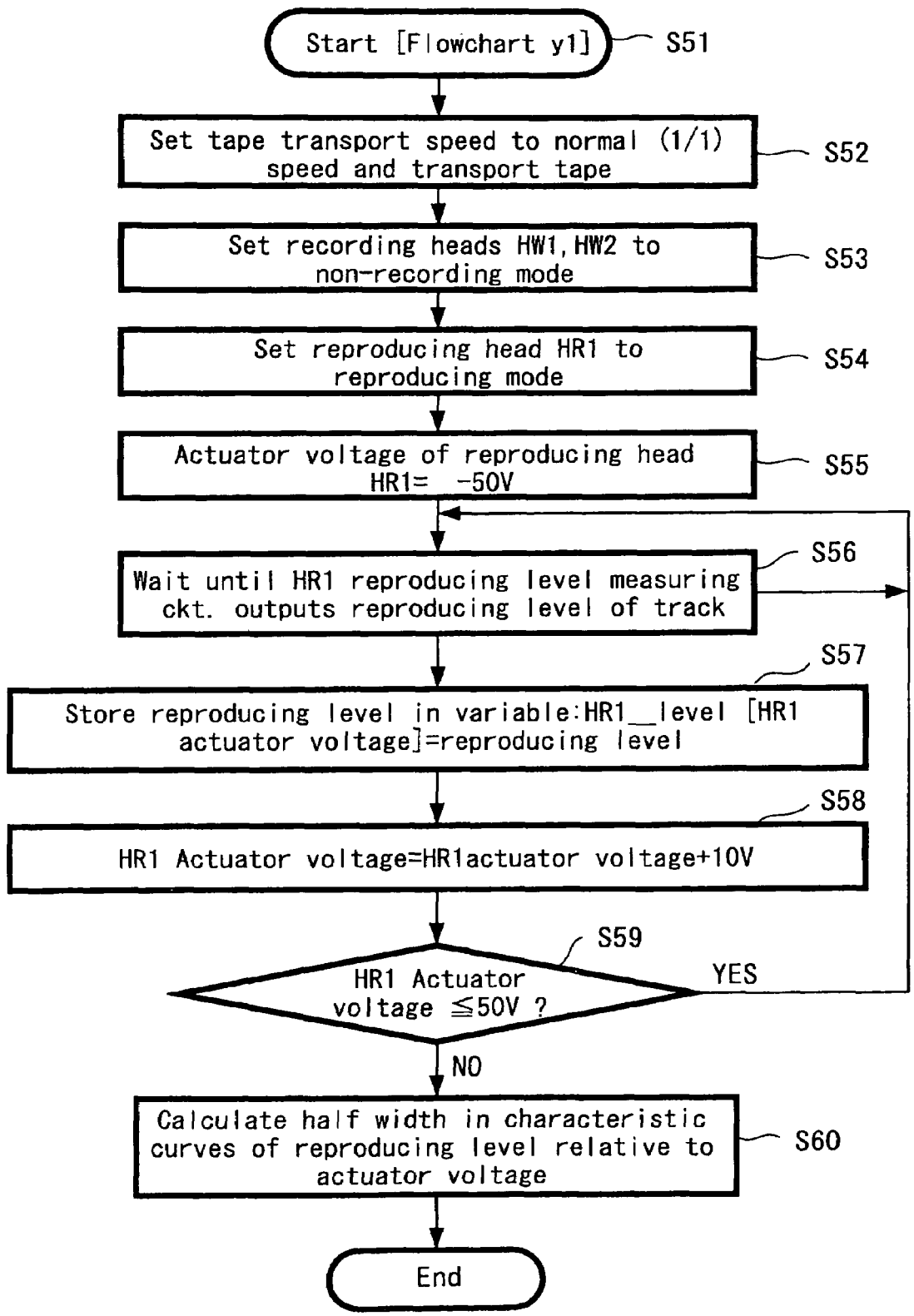
Figure 25B:
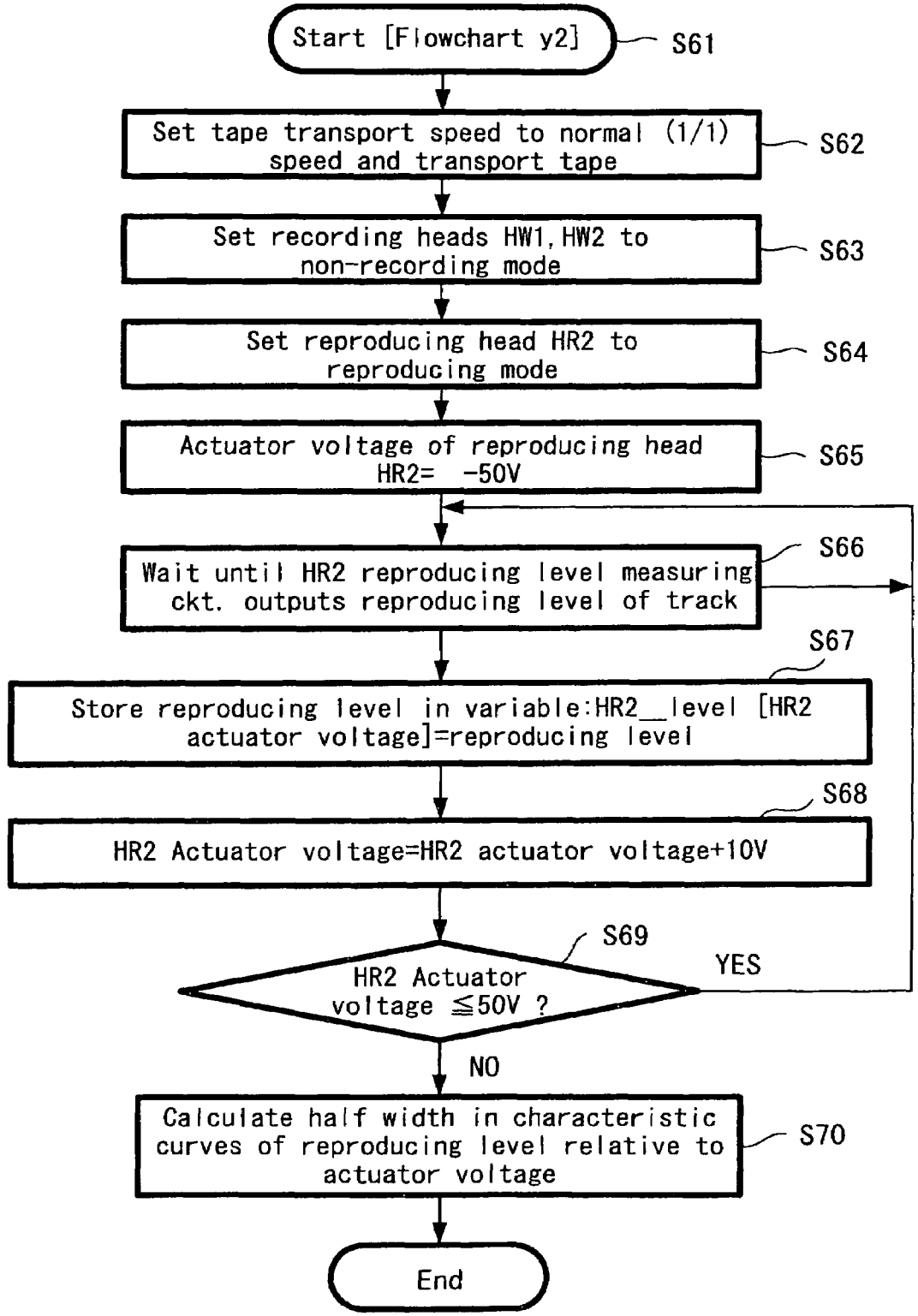

The [flowchart y1] shown in FIG. 25A and the [flowchart y2] shown in FIG. 25B show processes in which values (variables Ri now) corresponding to track widths are calculated relative to the tracks formed by the two recording heads HW1 and HW2 in the procedure shown in the [flowchart x] of FIG. 24.

The process to reproduce tracks by the reproducing head HR1 to thereby calculate track width will hereinafter be described with reference to the [flowchart y1] shown in FIG. 25A and the process to calculate track widths from track profiles obtained by reproducing the tracks with the reproducing head HR2 will be described with reference to the [flowchart y2] shown in FIG. 25B.

In the state in which the magnetic tape is rewound up to the starting position of the portion recorded at the step S48 in the [flowchart x] shown in FIG. 24, control goes to a step S51, whereat the [flowchart y1] is started by the CPU 110 (FIG. 7).

First, control goes to a step S52, whereat the magnetic tape is reproduced at the tape transport speed of the normal speed (1/1) and the magnetic tape is transported at this normal speed. Next, control goes to a step S53, whereat the recording heads HW1 and HW2 are set to the non-recording (non-writing) state and the reproducing head HR2 is set to the non-reproducing (non-reading) state. Then, control goes to a step S54, whereat the reproducing head HR1 is set to the reproducing (reading) state.

Next, control goes to a step S55, whereat the actuator voltage of the reproducing head HR1 is selected to be −50V, for example. After that, control goes to a step S56, whereat the magnetic tape recording and reproducing apparatus is set to the standby mode until the HR1 reproducing level measuring circuit 107a shown in FIG. 7 outputs a reproduced waveform of a measurement signal of the track. More specifically, tracks with small reproducing levels and in which a measurement signal is recorded by the recording head HR2 with an azimuth angle different from that of the reproducing head HR1 may be neglected.

Subsequently, control goes to a step S57, whereat the reproducing level obtained from the amplitude of the reproduced waveform of the measurement signal by the HR1 reproducing level measuring circuit 107a is stored as data corresponding to the actuator voltage of the reproducing head HR1. In the form in which the reproducing level is stored, similarly to the [flowchart v1] shown in FIG. 23A, the variable HR1_level [actuator voltage of reproducing head HR1] is introduced and HR1_level [actuator voltage of reproducing head HR1]=reproducing level is satisfied (step S57).

Next, control goes to a step S58, whereat [actuator voltage of reproducing head HR1]=[actuator voltage of reproducing head HR1]+[10V] is satisfied. Then, the position of the reproducing head HR1 is displaced in the track width direction by changing the actuator voltage from −50V to +50V in the unit of 10V, for example.

Subsequently, control goes to the next decision step S59, whereat it is determined whether or not the actuator voltage of the reproducing head HR1 reaches 50V. If the actuator voltage of the reproducing head HR1 is less than 50V as represented by a YES at the decision step S59, then control goes back to the step S56. If on the other hand the actuator voltage of the reproducing head HR1 is greater than 50V as represented by a NO at the decision step S59, then control goes to the next step S60.

At the step S60, half widths in the track profiles of "reproducing level" relative to "actuator voltage" are calculated. These values become variables Ri now corresponding to the track width of the tracks Tr1 and Tr2 (FIGS. 3 and 4) formed based on the attachment states of the recording heads HW1 and HW2 at that time point.

More specifically, it is possible to reproduce the track recorded by the recording head HW1 to obtain the track profile to thereby calculate the variables Ri now corresponding to the track width by executing the [flowchart y1] following the [flowchart x].

Also, the [flowchart y2] of FIG. 25B shows processing to obtain a track width by calculating a track profile from a measurement signal recorded on the tape by the recording head HW2. In steps S61 to S70 on the [flowchart y2], the recording heads HW1 and HW2 are replaced with each other and the reproducing heads HR1 and HR2 are replaced with each other in the steps S51 to S60 of the [flowchart y1] shown in FIG. 25A and therefore the steps S61 to S70 need not be described.

In this case, it is possible to obtain track width variables R2 now by reproducing only the tracks recorded by the recording head HW2 with the reproducing head HR2 by executing the [flowchart y2] following the [flowchart x].

As described above, the track width variables Ri optimum that can be used as reference scale obtained in the first process shown in FIG. 16 and track width variables Ri now obtained in the second process shown in FIG. 17 are calculated relative to each of n recording heads HWi (i=1 to n). More specifically, totally 2n of two kinds of track width variables Ri optimum and Ri now (i=1 to n) are obtained from the two kinds of tracks formed by the same recording head HWi.

It is unavoidable that dispersions of the attachment positions of the recording heads HWi provided on the magnetic tape recording and reproducing apparatus reflect on the thus obtained n track width variables Ri now (i=1 to n).

For this reason, it is possible based on the previously-obtained track width variables Ri optimum (i=1 to n) whether the track width variables Ri now are proper or not. Further, these variables Ri optimum are used as target values and the attachment positions of the recording heads HWi can be adjusted in such a manner that the values of the variables Ri now may approach the variables Ri optimum.

Next, an outline of the procedure (third process) to adjust the height of the recording head HW from the two kinds of the track widths obtained in the first and second processes by the magnetic tape recording and reproducing apparatus 1 itself will be described with reference to steps c1 to c7 of a [flowchart C] shown in FIG. 18 and FIG. 7.

An outline of this third process will be described. First, as shown at the step c1 of the [flowchart C] shown in FIG. 18, the track width variable Ri optimum (i=1 to n) obtained at the first step is loaded from the memory.

Subsequently, the track width variables Ri now (i=1 to n) obtained in the second process are loaded from the memory.

After that, as shown at the step c3 of the [flowchart C], deviations Δi=|Ri optimum−Ri now| may be calculated relative to n sets of track width variables Ri optimum and Ri now (i=1 to n).

Further, as shown at the decision step c4 of the [flowchart C], it is determined whether or not all of deviations Δi (i=1 to n) may fall within a permissible range. If all of deviations Δi (i=1 to n) may fall within the permissible range as represented by a YES at the decision step c4, then control goes to a step c7 and leaves this loop of the [flowchart C]. If at least one deviation Δi (i=1 to n) lies outside the permissible range as represented by a NO at the decision step c4, then control goes to the next steps c5-1 and c5-2.

After that, as shown at a step c5 (c5-1, c5-2) of the [flowchart C], a predetermined recording head HW is displaced by the actuator.

More specifically, with respect to a head number p (1<p<n) of which deviation Δp falls within the permissible range, as shown at the step c5-1, a track width variable Rp now obtained in the second process may be regarded as substantially the same as the track width variable Rp optimum. Then, the position in the track width direction can be judged as proper and the recording head HWp is fixed (that is, a predetermined actuator voltage is continued to be applied).

On the other hand, with respect to a head number q (1<q<n) of which deviation Δq lies outside of the permissible range, as shown at the step c5-2, a track width variable Rq now obtained in the second process can be judged as being different from the track width variables Rq optimum. Then, the position of the recording head HWq can be judged as improper and the recording head HWq may be displaced in the track width direction (actuator voltage is increased or decreased by a predetermined amount and applied to the actuator as a new voltage so that the recording head HWq may be displaced).

After that, as shown at a step c6 of the [flowchart C], track width variables Ri now (i=1 to n) may be calculated again by executing the second process ([flowchart B]) and the calculated track width variables Ri now may be stored in the RAM 160 (FIG. 7). Then, steps c2 to c6 are executed until all of deviations Δi (i=1 to n) fall within the permissible range.

Then, as shown at the step c7 of the [flowchart C], the positions of the recording heads HWi in the track width direction obtained when all of the deviations Δi (i=1 to n) fall within the permissible range are stored in the memory.

In this manner, in the magnetic tape recording and reproducing apparatus, the positions of the track width direction in which proper track widths are obtained by the n recording heads HWi can be determined as voltages applied to the actuators on which the recording heads HWi are mounted and therefore calibration of the recording heads HWi can be executed.

While the procedures from the first process to the third process have been so far described with reference to FIGS. 1, 2, 3, 7, 14, 16, 17, 18, 19, 20, 21, 22A, 22B, 23A, 23B, 24, 25A and 25B, a series of processing of the calibration of the recording heads HWi (i=1 to n) in the magnetic tape recording and reproducing apparatus will be described with reference to a [flowchart D] shown in FIGS. 26 and 27 and FIGS. 3 and 4.

Figure 26:
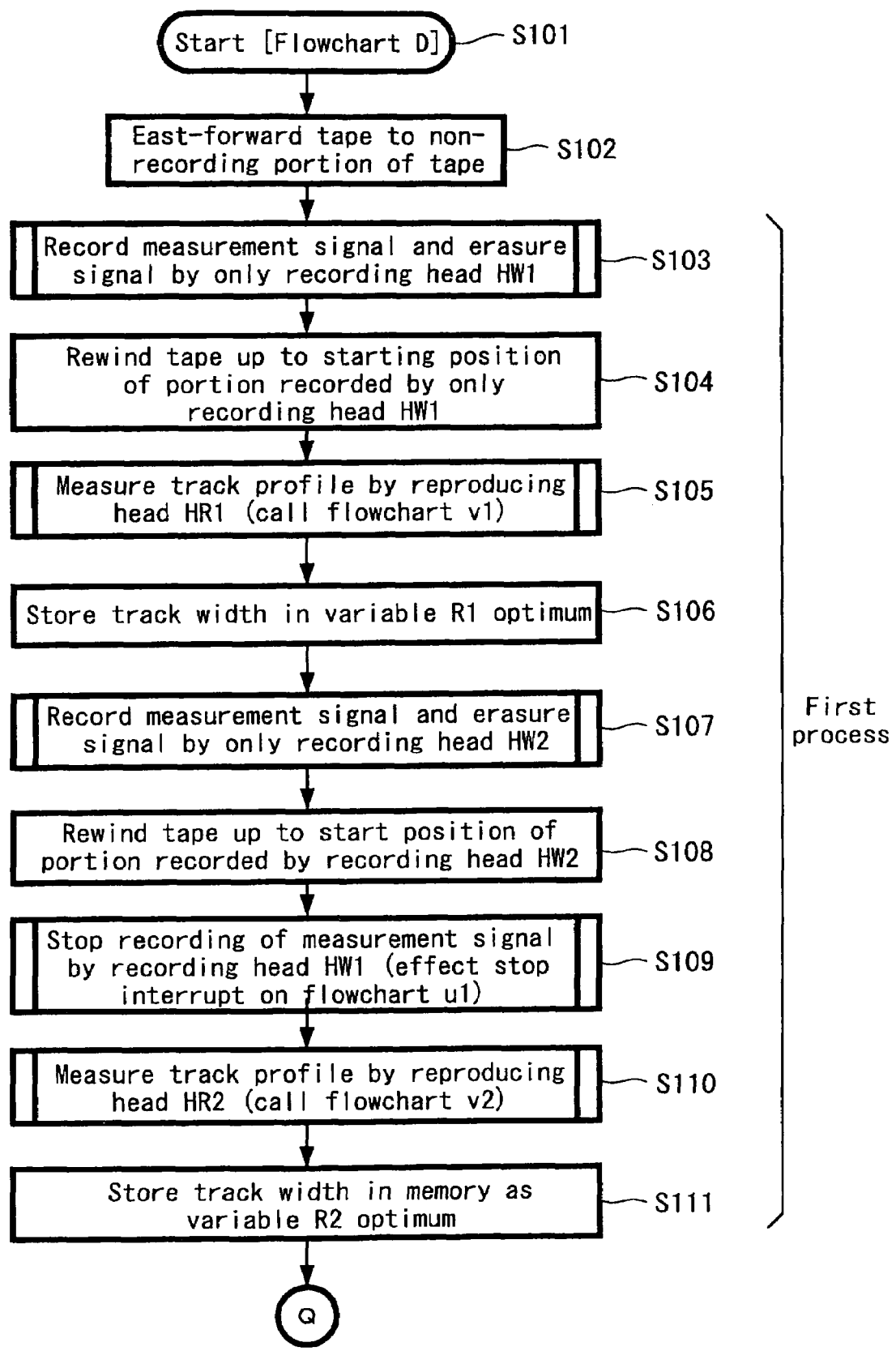
FIG. 26 is a flowchart showing a first process of a [flowchart D] that is a processing procedure in which the position of the recording head is calibrated in a method of adjusting a recording head of a magnetic tape recording and reproducing apparatus according to the embodiment of the present invention.

As shown in FIG. 26, in the state in which the magnetic tape is set to the magnetic tape recording and reproducing apparatus 1, first, control goes to a step S101, whereat a calibration start command is issued from the CPU 110 (FIG. 7). Next, control goes to a step S102, whereat the magnetic tape is fast-forwarded to the blank area of the tape end, for example. Then, the [flowchart u1] shown in FIG. 22A is activated and control goes to a step S103, whereat a measurement signal and an erasure signal are recorded by only the recording head HW1. Then, control goes to a step S104, whereat the tape is rewound up to the starting position of the portion recorded by only the recording head HW1.

Subsequently, the [flowchart v1] shown in FIG. 23A is accessed and control goes to a step S105, whereat the track recorded by only the recording head HW1 is reproduced by the reproducing head HR1 and a track width is calculated from the reproduced measurement signal. Then, control goes to a step S106, whereat this track width is stored in the memory as the variable Ri optimum.

Next, the [flowchart u2] shown in FIG. 23B is activated and control goes to a step S107, whereat a measurement signal and an erasure signal are recorded by only the recording head HW2. Then, control goes to a step S108, whereat the magnetic tape is rewound up to the starting position of the recorded portion. Subsequently, control goes to a step S109, whereat the recording operation of the recording head HW1 is stopped.

Next, the [flowchart v2] shown in FIG. 23B is accessed, and control goes to a step S110, whereat the track recorded only by the recording head HW2 is reproduced by the reproducing head HR2 and a track width is calculated from the reproduced measurement signal. Then, control goes to a step S111, whereat this track width is stored in the memory as a variable R2 optimum.

The above-mentioned steps S103 to S111 are processing corresponding to the first process. As a result, the track widths obtained by reproducing the tracks recorded by only one of the recording heads HWi and HW2 with the reproducing heads HR1 and HR2 can be obtained as the variable R1 optimum and the variable R2 optimum.

Next, the second process and the third process of the calibration processing will be described with reference to a flowchart of FIG. 27. First, control goes to a step S112, whereat the actuator voltages on which the recording heads HW1 and HW2 are mounted are respectively set to 0V. At this time point, the positions of the two recording heads HW1 and HW2 in the track width directions are not yet calibrated.

Next, the [flowchart x] shown in FIG. 24 is accessed, and control goes to a step S113, whereat tracks are formed by recording a measurement signal for track profile measurement with the two recording heads HW1 and HW2.

Next, control goes to a step S114, whereat the magnetic tape is rewound up to the starting position of the portion recorded at the [flowchart x] shown in FIG. 24. Then, the [flowchart y1] shown in FIG. 25A is accessed, and control goes to a step S115, whereat the track width is calculated from the measurement signal which results from reproducing the track recorded by the recording head HW1 by the reproducing head HR1. Then, control goes to a step S116, whereat this track width is stored in the memory as the variable R1 now.

Subsequently, the [flowchart y2] shown in FIG. 25B is accessed, and control goes to a step S117, whereat a track width is calculated from the measurement signal which results from reproducing the track recorded by the recording head HW2 with the reproducing head HR2. Then, control goes to a step S118, whereat this track width is stored in the memory as the variable R2 optimum.

The above-mentioned steps S112 to S118 are processing corresponding to the second process, wherein the track widths corresponding to the predetermined conditions, that is, the attached states of the recording heads HW1 and HW2 can be obtained as the variables Ri now and R2 now.

Next, control goes to the next decision step S119, whereat it is determined whether the track width recorded by the recording head HWi is wide or narrow.

More specifically, at this decision step S119, the reference variable Ri optimum and the variable Ri now obtained under the standard operation conditions are compared with each other. In this embodiment of the present invention, if $\Delta_1 < |Ri\ optimum - Ri\ now|$ is satisfied relative to the previously-determined deviation $\Delta_1$ in which $\Delta_1 > 0$ is satisfied, then the calculated variable Ri now is able to supply a proper track width and it is determined that the recording head HW1 is located at the position within the permissible range. If $\Delta_1 > |R1\ optimum - Ri\ now|$ is satisfied, then it is determined that the recording head HW1 is not located at the position within the permissible range.

To be more concrete, if the variable R1 now satisfies $R1\ optimum \times \delta < |R1\ optimum - R1\ now|$ relative to $\delta (0 < \delta < 1)$, then $(1-\delta) \times R1\ optimum < R1\ now < (1+\delta) \times R1\ optimum$ is established. Thus, if $\delta = 0.1$ and $0.9 \times R1\ optimum < R1\ now < 1.1 \times R1\ optimum$ are satisfied, then it is determined that the track width of the recording head HW1 is proper and the position at which the recording head HW1 is located at that time is maintained.

On the other hand, if $1.1 \times R1\ optimum \leq R1\ now$ is satisfied, then it is determined that the track width formed by the recording head HW1 is too wide. If $R1\ now \leq 0.9 \times R1\ optimum$ is satisfied, then it is determined that the track width formed by the recording head HW1 is too narrow. Accordingly, in accordance with a decision at a decision step S121 and processing which will be described later on, the recording head HW2 (or HW1) is displaced by the actuator.

Next, it is determined at the decision step S121 whether the track width recorded by the recording head HW2 is wide or narrow. Similarly to the above-mentioned recording head HW1, if $\Delta_2 < |R2\ optimum - R2\ now|$ is satisfied relative to deviation $\Delta_2$ in which $\Delta_2 > 0$ is satisfied, then the variable R2 now is able to supply a proper track width and it is determined that the recording head HW2 is located at the position which falls within the permissible range.

Also, if $\Delta_2 > |R2\ optimum - R2\ now|$ is satisfied, then it is determined that the recording head HW1 is not located at the position which falls within the permissible range.

To be more concrete, similarly as described above, if a variable R2 now satisfies $0.9 \times R2\ optimum < R2\ now < 1.1 \times R2\ optimum$ relative to $\delta\ (0 < \delta < 1)$ where $\delta = 0.1$, for example, is satisfied, then it is determined that a relative positional relationship between the recording head HW2 and the reproducing head HR2 is proper, and such positions are maintained.

Then, if $1.1 \times R2\ optimum < R2\ now$ is satisfied, then it is determined that the track width is too wide. If $R2\ now \leq 0.9 \times R2\ optimum$ is satisfied, then it is determined that the track width is too narrow. Then, in accordance with the decision at the decision step S121 and processing, the recording head HW2 (or HW1) is displaced by the actuator.

Next, it is determined at the decision step S121 whether or not all of the variables R1 now and R2 now of the track widths formed by the recording heads HW1 and HW2 are proper values.

If all of the variable R1 now and R2 now are proper values as represented by a YES at the decision step S121, then control goes to a step S123 and control leaves this processing loop. If on the other hand at least one of the variables R1 now and R2 now is not a proper value as represented by a NO at the decision step S121, then control goes to a step S122 and enters a loop in which the steps S113 to S121 are repeated.

More specifically, it is determined at the decisions step S121 that at least one of the track width variables R1 now and R2 now is not a proper value, then control goes to the step S122, whereat a voltage applied to the actuator on which the recording head HW2 is provided is changed by a predetermined difference ΔV. Then, after the recording head HW2 was displaced in the track width direction, the steps S113 to S121 are again executed and these steps S113 to S121 are repeated until both of the variables R1 now and R2 now become the proper values.

Also, if it is determined at the decision step S121 that both of the track width variables R1 now and R2 now are the proper values, then the two recording heads HW1 and HW2 are located at the proper positions and control goes to a step S123, whereat the voltage applied to the actuators on which the two recording heads HW1 and HW2 are mounted are stored in the memory (RAM 160 shown in FIG. 7). Then, control goes to a step S124, whereat the magnetic tape is rewound up to the position of the end of the data recorded portion. Then, control goes to a step S125, whereat calibration is ended.

The above-mentioned steps S119 to S124 are processing corresponding to the third process. As a result, the recording heads HW1 and HW2 can be adjusted to the proper positions relative to the attachment surface of the rotary drum.

Herein, processing at the step S122 shown in FIG. 27 will be described.

First, in the normal operation state, in the magnetic tape recording and reproducing apparatus 1 according to the embodiment of the present invention, a set of tracks Tr1 and Tr2 are constantly recorded by the two recording heads HW1 and HW2. For this reason, a sum of the variable R1 now of the width of the track Tr1 and the variable R2 now of the width of the track Tr2 becomes constant (R1 now+R2 now=constant). As a result, it is to be understood that the operation to displace the recording head HW1 so as to increase the variable R1 now of the width of the track Tr1 is equivalent to the operation to displace the recording head HW2 so as to decrease the variable R2 now of the width of the track Tr2.

Also, in the magnetic tape recording and reproducing apparatus 1 according to the embodiment of the present invention, the displacement direction of the recording head HW relative to the voltage applied to the actuator will be prescribed as follows. That is, by the forward direction voltage applied to the actuator, the recording heads HW1 and HW2 are displaced in such a manner that the track positions are shifted in the upper direction at a right angle of the track along the direction shown by the arrow β in FIG. 4.

The difference ΔV of very small voltage used to obtain a new voltage applied to the actuator in order to displace the recording head in accordance with the decision at the step S122 will be described below.

At that time, as shown in FIG. 4, in order to obtain track widths in which the tracks Tr1 and Tr2 are equal as shown in FIG. 3 from the state in which the width of the track Tr1 is narrower than that of the track Tr2, the recording head HW2 is displaced in the upper direction of the arrow direction β1 of the track width by additionally adding the difference ΔV of the forward direction voltage to the actuator of the recording head HW2 so that the track Tr2 may be shifted in the upper direction. Also, conversely, the recording head HW1 is displaced in the lower direction of the arrow direction β2 of the track width by additionally adding the difference ΔV of the reverse direction voltage to the actuator of the recording head HW1 so that the track Tr1 may be shifted in the lower direction.

More specifically, in the magnetic tape recording and reproducing apparatus 1 including the two recording heads HW1 and HW2, it is sufficient that only any one of the two heads may include the actuator.

The step S122 describes the process assuming the state in which the actuator on which the recording head HW1 is provided is set to the fixed state but only the actuator on which the recording head HW2 is provided is set to the movable state.

Then, if it is determined that the width of the track Tr1 is narrow, then a voltage of [actuator voltage+ΔV] is newly set to the actuator voltage of the recording head HW2 so that the recording head HW2 is displaced in the upper direction. Then, control goes back to the step S113.

In a like manner, if it is determined that the width of the track Tr1 is wide, then a voltage of [actuator voltage−ΔV] is newly set to the actuator voltage of the recording head HW2 so that the recording head HW2 is displaced in the lower direction. Then, control goes back to the step S113.

Also, if it is determined that the width of the track Tr2 is wide, then a voltage of [actuator voltage+ΔV] is newly set to the actuator voltage of the recording head HW2 so that the recording head HW2 is displaced in the upper direction. Then, control goes back to the step S113.

Further, if it is determined that the width of the track Tr2 is narrow, then a voltage of [actuator voltage−ΔV] is newly set to the actuator voltage of the recording head HW2 so that the recording head HW2 is displaced in the lower direction. Then, control goes back to the step S113.

While only the actuator on which the recording head HW2 is mounted is made movable as described in the step S122, the present invention is not limited thereto and it is possible that only the actuator on which the recording head HW1 is mounted may be made movable. In this case, the difference ΔV of the very small voltage may be applied to the actuator in the state in which the polarity of the difference ΔV of the very small voltage may be reversed.

In the magnetic tape recording and reproducing apparatus 1 according to the embodiment of the present invention, the number of actuators provided on n recording heads HWi (i=1 to n) may be (n−1). Then, the voltages applied to the (n−1) actuators which displace the proper recording heads HWi are stored in the RAM 160 (FIG. 7) of the memory of the host computer 101 as data in the calibration. As a result, upon next recording mode or immediately after the magnetic tape recording and reproducing apparatus 1 is powered, data (voltages applied to (n−1) actuators) in calibration are read out from the RAM 160 and displacement of the recording heads HWi in the track width direction may be set automatically so that a series of the above-mentioned calibration processing operation can be simplified.

Also, in the magnetic recording and reproducing apparatus according to the related art, even when a plurality of recording heads is adjusted in advance in response to narrow tracks, recording heads are shifted in position from the originally adjusted state due to change of temperature and aging change and a relative positional relationship among a plurality of recording head is changed. There is then a risk that it will become unable to carry out proper recording. However, in the magnetic tape recording and reproducing apparatus according to the embodiment of the present invention, calibration done by the magnetic tape recording and reproducing apparatus (self-adjustment function) can be automatically executed so long as recordable tape is loaded onto the magnetic tape recording and reproducing apparatus.

More specifically, while a temperature is being monitored by a temperature sensor previously installed within the apparatus, for example, when a detected temperature is changed from a predetermined temperature range or at a predetermined time in unison with an operation time, calibration can be executed automatically so that the position of the recording head can be calibrated.

Also, in a data recording and reproducing apparatus, it is customary that error detection to detect errors from data reproduced upon recording and error correction to correct errors upon error detection may be carried out. If detected errors are not corrected, then based on a command from the host computer 101, the tape may be rewound and re-reading (retry of reproduction) may be executed and retries of predetermined number will be executed until data can be restored.

The magnetic tape recording and reproducing apparatus according to the embodiment of the present invention is not limited to retry. That is, even when error occurs in the read after write (simultaneous recording and reproduction) to confirm whether data is normally recorded on the tape so that retry frequency of reproducing operation may become larger than a predetermined number or "error correction impossible" of data occurs in self error correction function of the decoder circuit 106 (FIG. 7) generally provided in the magnetic tape recording and reproducing apparatus 1, the position of the recording head can be automatically calibrated.

Figure 5:
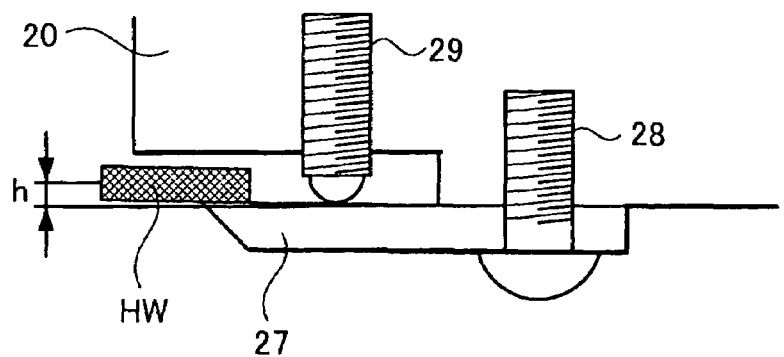
FIG. 5 is a schematic diagram useful for explaining attachment/adjustment structure of a recording head on a rotary drum of a helical scan system magnetic tape recording and reproducing apparatus according to the related art.
Figure 6A:
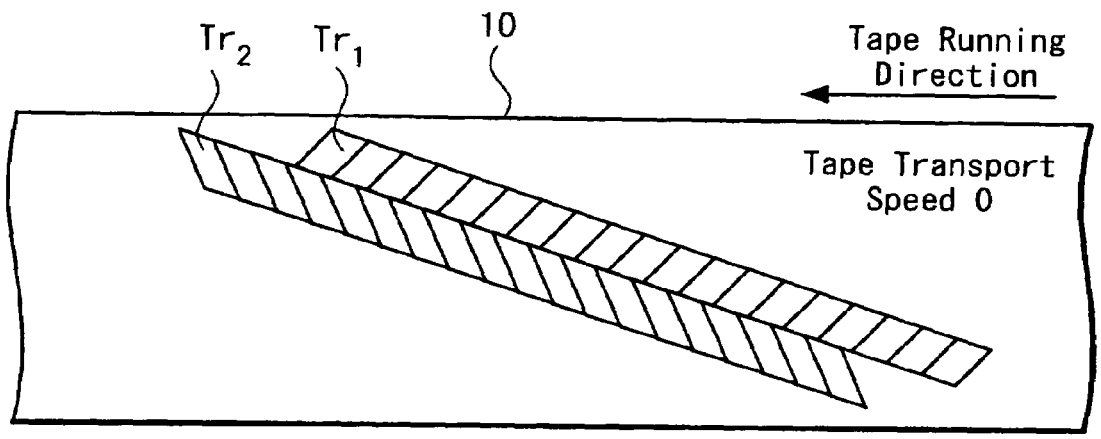
FIGS. 6A and 6B are schematic diagrams useful for explaining a method of adjusting a recording head of a helical scan system magnetic tape recording and reproducing apparatus according to the related art, respectively.
Figure 6B:
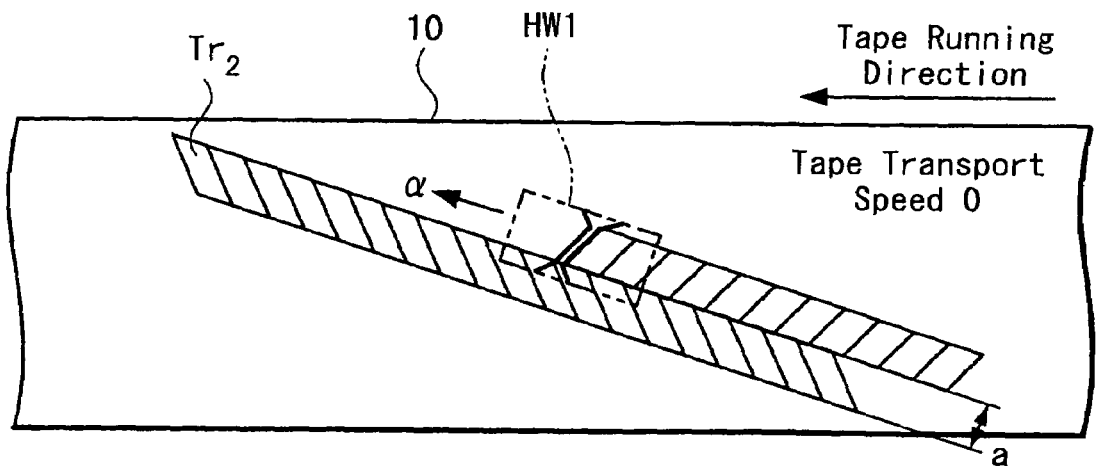

For this reason, according to the related art, as shown in FIG. 5, since the recording head position is adjusted by using the head height adjustment screw, when the position of the recording head is changed due to heat shock or vibrations after the magnetic tape recording and reproducing apparatus were delivered from the factory, it is unavoidable that the magnetic tape recording and reproducing apparatus are out of order, that is, the magnetic tape recording and reproducing apparatus are unavailable. However, according to the magnetic tape recording and reproducing apparatus 1 of the embodiment of the present invention, since calibration can be executed automatically and the position of the recording head can be properly made suitable, it is possible to remove a trouble caused by inappropriate recording head position.

It should be noted that whether or not recorded data is correct may be determined simply by parity check of header address of track instead of judging recorded data itself.

According to a method of adjusting a recording head of magnetic tape recording and reproducing apparatus of the embodiment of the present invention, even when dispersions of characteristics occur in the n recording heads HWi (i=1 to n) and the m reproducing heads HRj (j=1 to m), the reference track width (variable Ri optimum) is calculated in a combination of the recording heads HWi and the reproducing heads HRj and (n−1) recording heads HWi are displaced in the track width direction based on this track width in such a manner that the track width (variable Ri now) calculated under ordinary use conditions may fall within a predetermined deviation. Thus, each of the n recording heads can be adjusted at the proper position.

According to the magnetic tape recording and reproducing apparatus of the embodiment of the present invention, since the track widths formed by a plurality of recording heads can be made narrow and equal, data can be recorded at high density. Also, since read errors in the reproducing mode can be decreased and the heights of the recording heads can be properly and automatically optimized under previously-determined conditions, a trouble caused by improper heights of recording heads can be removed and original performance of the magnetic tape recording and reproducing apparatus can be maintained for a long period of time.

While the magnetic tape recording and reproducing apparatus according to the embodiment of the present invention uses a partial response class 4 as a signal transmission characteristic and a Nyquist frequency (=channel frequency/2) as an erasure signal as described above, since it is possible that the erasure signal may be a signal component outside the reproducing band, magnetic information can be erased by AC (alternating current) erasure based on a signal considerably higher than a maximum recording frequency or by DC (direct current) erasure to supply a DC current to recording heads. However, although it is customary that high frequency should be recorded by the AC erasure so that difficulty in circuit design is increased unavoidably and that DC erasure is difficult because of DC interrupting characteristic of a rotary transformer, the rotary drum 20, for example, may include a built-in AC erasure signal or DC erasure signal generating circuit to enable a desired erasure signal to be recorded on the tape by the supply of power through the rotary transformer and a trigger signal.

A method of adjusting a recording head of a magnetic tape recording and reproducing apparatus and a magnetic tape recording and reproducing apparatus according to the present invention are not limited to the above-mentioned embodiments and it is needless to say that the present invention can take various arrangements.

It should be understood by those skilled in the art that various modifications, combinations, sub-combinations and alterations may occur depending on design requirements and other factors insofar as they are within the scope of the appended claims or the equivalents thereof.

What is claimed is:

1. A method of adjusting a recording head of a helical scan system magnetic tape recording and reproducing apparatus for recording and/or reproducing data on and/or from a magnetic tape by n recording heads and m reproducing heads mounted on a rotary drum comprising the steps of:

a first process in which a plurality of tracks is formed on said magnetic tape by alternately supplying a measurement signal and an erasure signal to an i-th (i=1 to n) recording head of said n recording heads, a track formed by said i-th recording head is reproduced by a j-th (j=1 to m) reproducing head of said m reproducing heads, a variable Ri_optimum corresponding to a width of a track formed by said i-th recording head is obtained from a reproduced signal obtained by said reproduction and n variables Ri_optimum (i=1 to n) corresponding to the widths of said tracks are sequentially obtained from said plurality of tracks formed by each of said n recording heads by repeating the above-mentioned operations n times;

a second process in which a plurality of tracks is formed on said magnetic tape by supplying a measurement signal to said n recording heads, a track formed by said i-th (i=1 to n) recording head of said n recording heads is reproduced by said j-th reproducing head, a variable Ri_now corresponding to a width of a track formed by said i-th recording head is obtained from a reproduced signal obtained by said reproduction and n variables Ri_now (i=1 to n) corresponding to said track widths are sequentially obtained from said plurality of tracks formed by each of said n recording heads by repeating the above-mentioned operations n times; and a third process in which said recording head is positioned such that deviation $\Delta i$, $\Delta i = |Ri\_optimum - Ri\_now|$ (i=1 to n) obtained from said variable Ri_optimum of said i-th track width obtained from said first process and said variable Ri_now of said i-th track width obtained from said second process of said track formed by said i-th recording head becomes smaller than a desired value in all of said n recording heads.

2. A method of adjusting a recording head of a magnetic tape recording and reproducing apparatus according to claim 1, wherein said erasure signal in said first process is recorded on adjacent tracks ahead of and behind said track at their areas adjacent to said measurement signal area relative to said track at its measurement signal area in which said measurement signal is recorded and said erasure signal has a signal frequency of which amplitude of an output waveform can be effectively regarded as zero in the outside of the band of said measurement signal.

3. A method of adjusting a recording head of a magnetic tape recording and reproducing apparatus according to claim 2, wherein said magnetic tape recording and reproducing apparatus uses a partial response system as transmission in said magnetic tape recording and reproducing apparatus, said erasure signal having a signal frequency of [channel clock frequency]/2.

4. A method of adjusting a recording head of a magnetic tape recording and reproducing apparatus according to claim 1, wherein said track width variable Ri_optimum (i=1 to n) in said first process is obtained from reproducing level characteristic of a j-th reproducing head in said m reproducing heads.

5. A method of adjusting a recording head of a magnetic tape recording and reproducing apparatus according to claim 4, wherein said reproducing level characteristic is obtained from reproducing level of said measurement signal relative to the position at which said j-th reproducing head is placed in said track width direction.

6. A method of adjusting a recording head of a magnetic tape recording and reproducing apparatus according to claim 5, wherein said reproducing head provided on an actuator fixed to said rotary drum is constructed such that it can be freely displaced in said track width direction of said magnetic tape by said actuator, said reproducing head reproduces said magnetic tape to obtain said reproducing level as an amplitude of a reproduced waveform of said measurement signal in the reproducing state or simultaneous recording and reproducing state of said magnetic tape while said reproducing head is being displaced in said track width direction.

7. A method of adjusting a recording head of a magnetic tape recording and reproducing apparatus according to claim 1, wherein said track width variable Ri_now (i=1 to n) in said second process is obtained from reproducing level characteristic of a j-th reproducing head in said m reproducing heads.

8. A method of adjusting a recording head of a magnetic tape recording and reproducing apparatus according to claim 7, wherein said reproducing level characteristic is obtained from reproducing level of said measurement signal relative to the position at which said j-th reproducing head is placed in said track width direction.

9. A method of adjusting a recording head of a magnetic tape recording and reproducing apparatus according to claim 1, wherein positioning of said recording head in the third process is carried out such that said i-th recording head is positioned at said position if $-\Delta_{2i} \leq Ri\_optimum - Ri\_now \leq \Delta_{1i}$ is satisfied with respect to said track width variable Ri_optimum (i=1 to n) obtained in said first process and said track width variable Ri_now (i=1 to n) obtained in said second process where $\Delta_{1i}$ and $\Delta_{2i}$ ($0<\Delta_{2i}$, $0<\Delta_{1i}$) are deviations, an actuator corresponding to said i-th recording head is driven in the direction in which said track width variable becomes larger than said track width variable Ri_now of said point of time so that said i-th recording head is positioned if $Ri\_optimum - Ri\_now < -\Delta_{2i}$ is satisfied and that an actuator corresponding to said i-th recording head is driven in the direction in which said track width variable becomes smaller than said track width variable Ri_now of said point of time so that said i-th recording head is positioned if $\Delta_{1i} < Ri\_optimum - Ri\_now$ is satisfied.

10. A method of adjusting a recording head of a magnetic tape recording and reproducing apparatus according to claim 1, wherein said magnetic tape includes a data pre-recorded area outside of which tracks to record said measurement signal and said erasure signal in said first process and tracks to record said measurement signal are formed.

11. A helical scan system magnetic tape recording and reproducing apparatus for recording and/or reproducing data on and/or from a magnetic tape by n recording heads and m reproducing heads mounted on a rotary drum, a magnetic tape recording and reproducing apparatus comprising:
  alternately supplying a measurement signal and an erasure signal to an i-th (i=1 to n) recording head of said n recording heads to form a plurality of tracks on said magnetic tape;
  reproducing a track formed by said i-th recording head by a j-th (j=1 to m) reproducing head of said m reproducing heads, obtaining a variable Ri_optimum corresponding to a width of a track formed by said i-th recording head from a reproduced signal obtained by said reproduction and sequentially measuring n variables Ri_optimum (i=1 to n) corresponding to a width of said track from a plurality of tracks formed by each of said n recording heads by repeating the above operation n times;
  forming a plurality of tracks on said magnetic tape by supplying a measurement signal to said n recording heads, reproducing a track formed by said i-th recording head (i=1 to n) of said n recording heads by said j-th (j=1 to m) reproducing head of said m reproducing heads, calculating a width of a track formed by said i-th recording head from a reproduced signal obtained by said reproduction and sequentially measuring n variables Ri_now (i=1 to n) corresponding to said track width from said plurality of tracks formed by each of said m reproducing heads by repeating the above operation n times; and
  displacing said recording head in said track width direction by an actuator provided on said rotary drum such that n deviations between said variable Ri_optimum and said variable Ri_now become smaller than a desired value.

* * * * *